United States Patent
Sang et al.

(10) Patent No.: US 10,498,504 B2
(45) Date of Patent: Dec. 3, 2019

(54) SYSTEM AND METHOD FOR USER EQUIPMENT OPERATIONS MANAGEMENT

(71) Applicant: Futurewei Technologies, Inc., Plano, TX (US)

(72) Inventors: Aimin Justin Sang, San Diego, CA (US); Richard Stirling-Gallacher, San Diego, CA (US); Bin Liu, San Diego, CA (US); Nathan Edward Tenny, Poway, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/376,167

(22) Filed: Dec. 12, 2016

(65) Prior Publication Data

US 2018/0048442 A1    Feb. 15, 2018

Related U.S. Application Data

(60) Provisional application No. 62/374,668, filed on Aug. 12, 2016.

(51) Int. Cl.
*H04L 5/00* (2006.01)
*H04B 17/318* (2015.01)
(Continued)

(52) U.S. Cl.
CPC ......... *H04L 5/0048* (2013.01); *H04B 7/0617* (2013.01); *H04B 7/0695* (2013.01);
(Continued)

(58) Field of Classification Search
CPC .. H04L 5/0048; H04W 72/046; H04B 17/318; H04B 7/0617
See application file for complete search history.

(56) References Cited

U.S. PATENT DOCUMENTS 9,853,668 B2 * 12/2017 Corbalis ................ H04B 1/123
2006/0221920 A1 * 10/2006 Gopalakrishnan ... H04B 7/0617
370/338
(Continued)

FOREIGN PATENT DOCUMENTS

WO  2009102124 A2  8/2009
WO  2014000602 A1  1/2014
(Continued)

OTHER PUBLICATIONS

"IEEE Standard for Information Technology—Telecommunications and information exchange between systems Local and metropolitan area networks—specific requirements; Part 11: Wireless LAN Medium Access Control (MAC) and Physical Layer (PHY) Specifications; Amendment 3: Enhancements for Very High Throughput in the 60 GHz Band", IEEE Computer Society, Dec. 28, 2012, 628 pages.
(Continued)

*Primary Examiner* — Mohammad S Anwar
(74) *Attorney, Agent, or Firm* — Slater Matsil, LLP

(57) ABSTRACT

A method for operating a user equipment (UE) adapted to perform beaconing includes beamforming a beacon signal in accordance with at least one transmit beam of a set of transmit beams, thereby producing at least one beamformed beacon signal, transmitting the at least one beamformed beacon signal on a first uplink channel, repeating the beamforming and the transmitting for remaining transmit beams of the set of transmit beams, and receiving downlink reference signals from a transmit-receive point using receive beamforming and beam adjustment.

38 Claims, 14 Drawing Sheets

(51) Int. Cl.
*H04B 7/06* (2006.01)
*H04W 72/04* (2009.01)
*H04B 7/08* (2006.01)

(52) U.S. Cl.
CPC .......... *H04B 7/088* (2013.01); *H04B 17/318* (2015.01); *H04L 5/0023* (2013.01); *H04L 5/0051* (2013.01); *H04W 72/046* (2013.01)

(56) References Cited

U.S. PATENT DOCUMENTS

| | | | | |
|---|---|---|---|---|
| 2010/0016023 | A1* | 1/2010 | Yamauchi | H04L 5/0037 455/562.1 |
| 2011/0110340 | A1* | 5/2011 | Lakkis | H04W 74/08 370/336 |
| 2014/0119301 | A1* | 5/2014 | Park | H04L 5/0091 370/329 |
| 2015/0003348 | A1* | 1/2015 | Ishii | H04L 27/2601 370/329 |
| 2015/0365155 | A1* | 12/2015 | Subramanian | H04B 7/0697 370/329 |
| 2016/0099761 | A1 | 4/2016 | Chen et al. | |
| 2016/0134352 | A1 | 5/2016 | Stirling-Gallacher | |

FOREIGN PATENT DOCUMENTS

| | | |
|---|---|---|
| WO | 2014124048 A1 | 8/2014 |
| WO | 2015099750 A1 | 7/2015 |
| WO | 2016049840 A1 | 4/2016 |

OTHER PUBLICATIONS

Gelabert, "Narrowband Beacon Design", Apr. 27, 2016, 24 pages.
Hong, et al., "Study and Prototyping of Practically Large-Scale mmWave Antenna Systems for 5G Cellular Devices", Millimeter-Wave Communications for 5G, IEEE Communications Magazine, Sep. 2014, pp. 63-69.
Kela, et al., "Borderless Mobility in 5G Outdoor Ultra-Dense Networks", IEEE Access, vol. 3, Aug. 20, 2015, pp. 1462-1476.
Mediatek, Inc., "Mobility Supporting for HF-NR", 3GPP TSG-RAN WG2 #94, R2-163484, Nanjing, China, May 23-27, 2016, 6 pages.
Nitsche, T., et al, "IEEE 802.11 ad: Directional 60 GHz Communication for Multi-Gigabit-per-Second Wi-Fi", IEEE Communications Magazine, Radio Communications, Dec. 2014, 10 Pages, vol. 52, Issue 12, XP011567636.

* cited by examiner

SYSTEM AND METHOD FOR USER EQUIPMENT OPERATIONS MANAGEMENT

This application claims the benefit of U.S. Provisional Application No. 62/374,668, filed on Aug. 12, 2016, entitled "System and Method for User Equipment Beaconing and Beam Alignment," which application is hereby incorporated herein by reference.

TECHNICAL FIELD

The present invention relates generally to a system and method for digital communications, and, in particular embodiments, to a system and method for user equipment (UE) operations management, including beaconing, beam management, mobility management, and transmit-receive point (TRP) selection.

BACKGROUND

Upon power up or determining that a measurement trigger is received or met, a user equipment (UE), such as a mobile device, a station, a mobile station, a mobile, a terminal, a user, a subscriber, and so on, passively scans nearby transmit-receive points (TRPs), such as base station, access point, NodeB, evolved NodeB (eNB), gNodeBs (gNBs), master NodeB (MeNB) or master gNBs (MgNBs), secondary NodeB (SeNB) or secondary gNBs (SgNBs), and so on, for information or to make measurements. The scanning process is very costly in terms of power consumption and may lead to service interruptions.

In high frequency (HF) communications systems, such as communications systems that use frequencies greater than 6 GHz, including millimeter wave (mmWave) communications systems, beamforming is used at both the UE and the TRP to overcome link budget shortage due to high attenuation loss. DL scanning when beamforming is used usually takes more time and effort because the communications beams (transmission beams and reception beams) have to be aligned in order for UE and the TRP(s) to communicate. Furthermore, due to the smaller coverage areas of the HF TRPs (due to the high attenuation loss), frequent location changes due to the mobility of the UE, intermittent HF links between the TRP(s) and the UE, and so on, the DL scanning may occur more frequently, leading to greater power consumption, more service interruptions, and degraded performance.

SUMMARY

Example embodiments provide a system and method for user equipment (UE) operations management.

In accordance with an example embodiment, a method for operating a UE adapted to perform uplink beaconing in high frequency in particular is provided. The method includes beamforming, by the UE, a beacon signal in accordance with at least one transmit beam of a set of transmit beams, thereby producing at least one beamformed beacon signal, transmitting, by the UE, the at least one beamformed beacon signal on a first uplink channel, repeating, by the UE, the beamforming and the transmitting for remaining transmit beams of the set of transmit beams, and receiving, by the UE, downlink reference signals from a transmit-receive point (TRP).

In accordance with an example embodiment, a method for operating a TRP is provided. The method includes receiving, by the TRP, a beamformed beacon signal using at least one receive beam of a set of receive beams, the beamformed beacon signal is received on an uplink channel, and selecting, by the TRP, a best receive beam from the set of receive beams that is associated with a received signal strength of the beamformed beacon signal meeting a threshold or that has a better beamformed reference signal received signal strength than other receive beams.

In accordance with an example embodiment, a UE adapted to perform beaconing is provided. The UE includes a processor, and a computer readable storage medium storing programming for execution by the processor. The programming including instructions to configure the UE to beamform a beacon signal in accordance with at least one transmit beam of a set of transmit beams, thereby producing at least one beamformed beacon signal, transmitting at least one beamformed beacon signal on a first uplink channel, repeat the beamforming and the transmitting for remaining transmit beams of the set of transmit beams, and receive downlink reference signals from a TRP.

In accordance with an example embodiment, a TRP adapted to perform beaconing is provided. The TRP includes a processor, and a computer readable storage medium storing programming for execution by the processor. The programming including instructions to configure the TRP to receive a beamformed beacon signal using at least one receive beam of a set of receive beams, the beamformed beacon signal is received on an uplink channel, and a select a best receive beam from the set of receive beams that is associated with a received signal strength of the beamformed beacon signal meeting a threshold or that has a better beamformed reference signal received signal strength than other receive beams.

Practice of the foregoing embodiments enables uplink (UL) synchronization prior to traditional downlink (DL) synchronization, thereby simplifying the UE-side operations related to beam management (which includes initial beam alignment, beam refinement, and beam tracking, etc.) or spatial synchronization. The spatial synchronization may occur together with synchronization in other dimensions (e.g., time, frequency, and/or code). Furthermore, the selection of a serving TRP(s), the beam related measurements, and the UE tracking (including beam management and serving or candidate serving TRP changes, etc.) are performed by the network (e.g., TRPs mainly). Hence the UE-side measurement and report procedure is simplified. In another example embodiment, the foregoing embodiments can be executed after legacy operations where DL synchronization is first completed either in a conventional manner by UE, or by other orthogonal techniques such as signaling from a low frequency (LF) in-between UE to the network. In yet another example embodiment, the foregoing embodiments can be combined with the legacy operations involving conventional DL synchronization and beam alignment in HF, or with other techniques such as LF assisted synchronization.

In accordance with an example embodiment, for example when initial beam alignment and UE/TRP mutual discovery are not yet achieved, a narrow-band channel can be reserved, scheduled, or pre-configured between the UE and TRPs for the purpose of beaconing over the channel. Uplink beaconing from different UEs to the same TRP may be directionally received and distinguished through the use of scheduled channel resources for each beaconing, by physical layer decoding mechanisms, and/or by collision resolution mechanisms over shared channel resources, all with a carefully designed beacon format (e.g., incorporating some specified preamble format, reference signals, transmission pattern, beam ID, UE ID, or an association pattern between a beacon and a specific resource map, etc.), and the narrow-band beacon channel structure in time, space, and code, etc. In another example embodiment, when the synchronization between UE and TRP is maintained and beams aligned, beaconing may be based on SRS for continuous beam refinement and beam tracking.

UE-centric uplink beaconing on a narrow band channel may be more power efficient to the UE than the legacy technique that involves the UE continually passively scanning the downlink and then reporting in the uplink. In UE-centric uplink beaconing, the UE transmits uplink beacons without the necessity of downlink synchronization or active connections (e.g., connections with active data transmission and reception, and possibly with uplink sounding reference signals). The UE-centric uplink beaconing may be event triggered, such as by a backlog of uplink traffic, changes to UE context (such as UE location, direction, speed, and so on), signaling from a legacy (LF macro-cell) layer indicating downlink traffic or known TRP coverage (i.e., when needed), etc. The scanning burden is transferred to network equipment, which generally does not have power limitations or limitations in computational processing that a UE would.

UEs are discovered, beam aligned, and beam tracked based on network side measurements or scanning. Monitoring or detecting the uplink beaconing and beam alignment, which may be assisted by network or LF legacy layer network equipment, is conducted by serving or non-serving TRPs surrounding the UE, or any TRP configured by the network or LF legacy layer network equipment. Constant or discretely continuous beam alignment is possible by tracking directional beacons of a UE (using an angle of arrival or departure of the directional beacons, for example). The significantly less restrained computational resources, power, and antenna resources of TRPs are exploited rather than placing demands on the limited resources of the UE.

Initial access, UE/TRP discovery, beam alignment, and beam tracking are controlled by the UE, although they can be triggered either by the UE or the network. Virtual cells surrounding the UE are, therefore, easily formed, where a serving set of TRPs for a specific UE is allowed to change frequently without draining the resources of the UE, particularly when network device assistance is available. Measurements, tracking, and context maintenance are offloaded to the network side.

The best serving TRPs can be selected by the network based on measured signal quality (e.g., beacon signal quality) of links between the beam aligned UE and surrounding TRP(s). Upon initial power-on, during UE's mobility or during HF channel blockage, the TRP selection process can be performed continuously and dynamically by the network based on beaconing channel information from all the TRPs. Alternatively, the TRP selection process may be performed by TRPs themselves. In another example embodiment, the TRP selection can be jointly performed by the UE and the network. In different embodiments, the network may consist of purely HF TRPs, both LF and HF TRPs, or TRPs with other mobility control units.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

An event driven, power efficient, and proactive uplink beaconing system and method are provided herein. Beamformed uplink beaconing is transmitted by a device to enable uplink synchronization possibly before and/or after traditional downlink synchronization is performed. The system and method enable network-side scanning of narrow band uplink beaconing channels, beam management (including initial beam alignment, beam refinement, and beam tracking), spatial synchronization, and/or selection of a transmit-receive point (TRP) with or without assistance from a network device.

Figure 1:
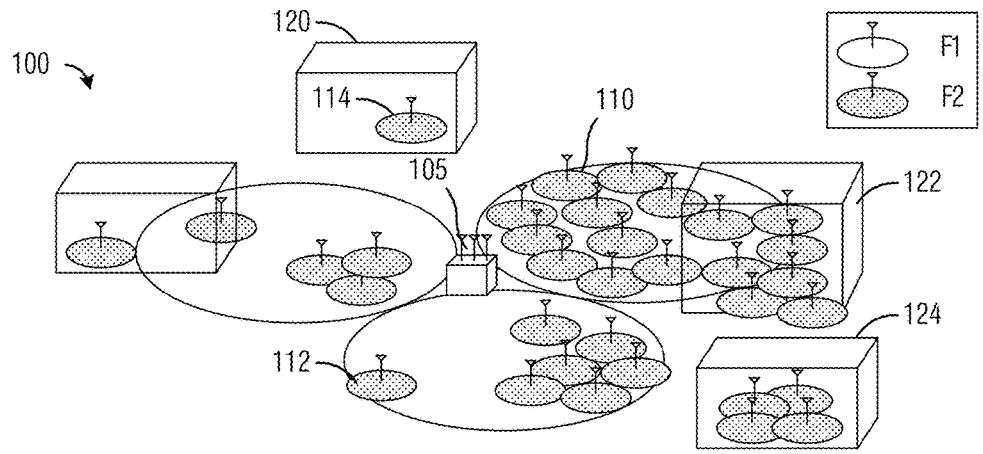
FIG. 1 illustrates an example communications system according to example embodiments described herein.

FIG. 1 shows an example communications system loft Communications system 100 is an ultra-dense network (UDN). Communications system 100 provides deployment scenarios of hybrid macro-cells, small cells, and standalone or macro-assisted small cells. As shown in FIG. 1, communications system 100 includes a macro layer providing low frequency (LF) coverage at a first carrier frequency F1 and a small cell layer (or similarly, a virtual cell layer) with high frequency (HF), e.g., millimeter wave (mmWave), coverage at a second carrier frequency F2. The macro layer includes legacy TRPs, such as base station, access point, NodeB, evolved NodeB (eNB), gNodeBs (gNBs), master NodeB (MeNB) or master gNBs (MgNBs), secondary NodeB (SeNB) or secondary gNBs (SgNBs), and so on, (e.g., TRP 105) with large coverage areas and are usually part of a planned infrastructure, examples of which include the Third Generation Partnership Project (3GPP) Long Term Evolution (LTE) compliant cellular communications systems. The small cell layer includes small cell TRPs (SC-TRPs), e.g., SC-TRPs 110, 112, and 114, with small coverage areas and is generally part of an unplanned infrastructure. The SC-TRPs of the small cell layer may be used to provide coverage in areas with poor macro layer coverage or to enhance communications system performance, such as in high density areas (including regions 120, 122, and 124). Some of the SC-TRPs shown in FIG. 1 are deployed in the coverage area of a legacy TRP (such as SC-TRPs 110 and 112), while other SC-TRPs are standalone SC-TRPs and are deployed where there is no legacy layer coverage (such as SC-TRP 114).

Although communications system 100 is shown in FIG. 1 as including both a macro layer and a small cell layer, the example embodiments discussed herein are also operable in a communications system that includes only a small cell layer. Alternatively, in a communications system with both a macro layer and a small cell layer, the macro layer may or may not provide assistance to the small cell layer, at least in terms of user equipment (UE) beaconing and beam alignment.

While it is understood that communications systems may employ multiple TRPs capable of communicating with a number of UEs, only one macro TRP and a plurality of SC-TRPs are illustrated for simplicity.

Figure 2:
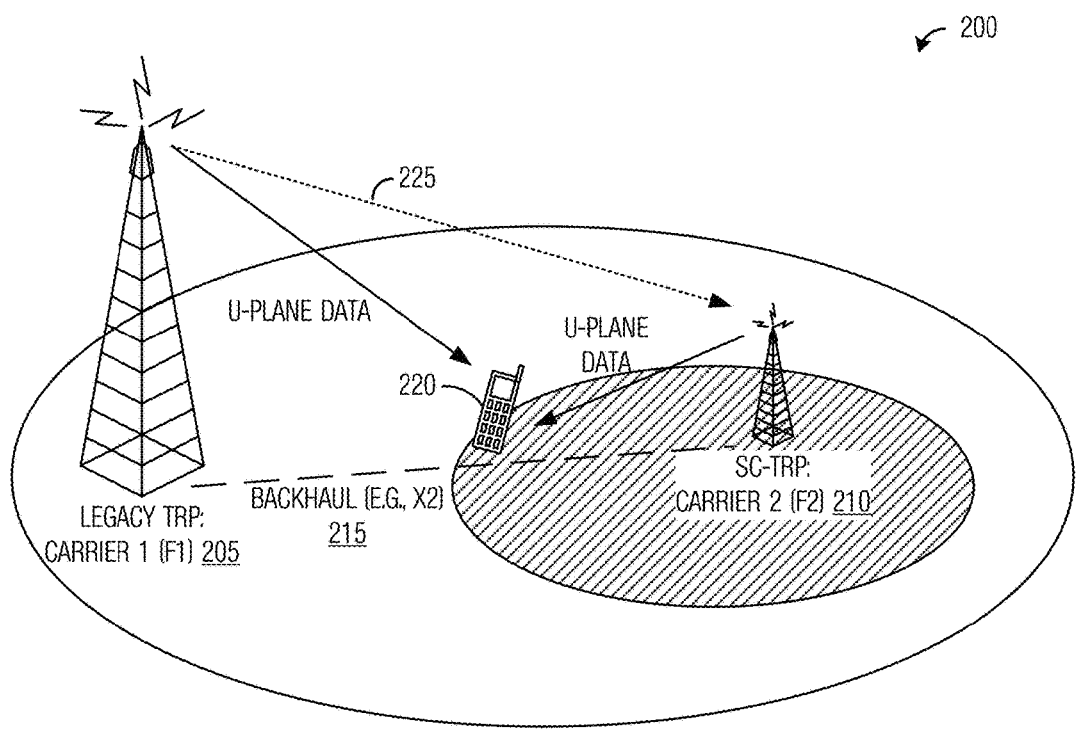
FIG. 2 illustrates a communications system highlighting performance enhancements through the use of small cells.

FIG. 2 illustrates a communications system 200 highlighting performance enhancements through the use of small cells. Communications system 200 uses small cells under the umbrella coverage of a macro cell, with the cells operating on different central frequencies, utilizing what is called a dual connectivity (DuCo or DC) concept in legacy LTE systems. Communications system 200 includes a legacy TRP 205 and a SC-TRP 210. Legacy TRP 205 and SC-TRP 210 are connected via a backhaul 215, which may be wireline or wireless. Operating within the coverage areas of both legacy TRP 205 and SC-TRP 210 is UE 220. The communications performance for UE 220 may be enhanced through the use of SC-TRP 210 to provide carrier aggregation (CA) where legacy TRP 205 and SC-TRP 210 both transmit user plane (U-plane) data to UE 220. Alternatively, communications performance for UE 220 may be enhanced in a DuCo configuration where packet data convergence protocol (PDCP) layer traffic is split between legacy TRP 205 and SC-TRP 210. The PDCP layer traffic is provided from legacy TRP 205 to SC-TRP 210 by link 225.

DuCo is proposed to address heterogeneous network (HetNet) mobility when small cells are deployed in the coverage of a macro cell. Normally, the macro cell (commonly referred to as macro eNB (MeNB), legacy eNB (LeNB), legacy TRP, etc.) may utilize spectrum that is lower in frequency than the small cells (commonly referred to as small eNB (SeNB) or SC-TRP, and so on). Control plane signaling is performed by the MeNB, thus avoiding handover signaling and UE context switching overhead when the UE is moving in and out of small cell coverage but remaining under the coverage of the same MeNB.

Figure 3A:
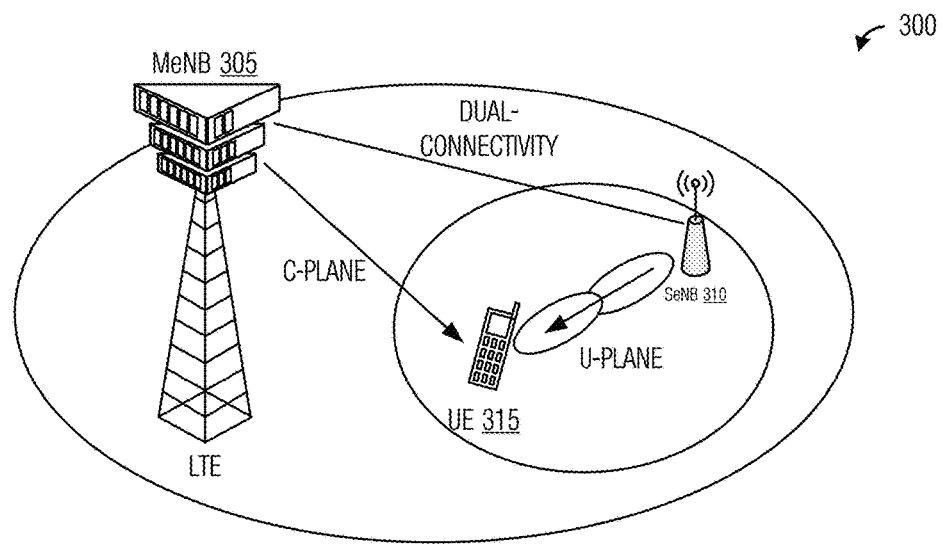
FIG. 3A illustrates a communications system highlighting a dual-connectivity (DuCo) deployment.

FIG. 3A illustrates a communications system 300 highlighting a DuCo deployment. Communications system 300 includes a split control plane and user plane and highlights legacy DuCo deployment. Communications system 300 includes a MeNB 305 and a SeNB 310 that possibly uses beamformed communications. Communications system 300 also includes a UE 315 that is connected to both MeNB 305 and SeNB 310. In the DuCo deployment, control plane (C-plane) signaling is performed by MeNB 305, while user plane communications is performed by SeNB 310. It is noted that MeNB 305 may also perform user plane communications.

Figure 3B:
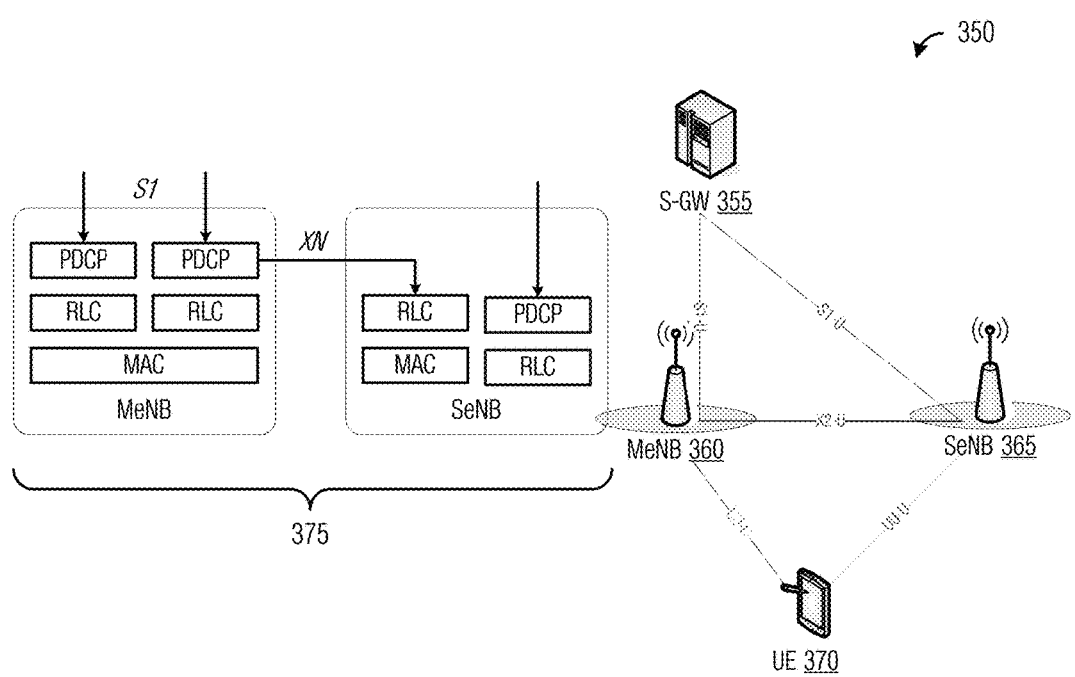
FIG. 3B illustrates the flow of U-plane data units (PDUs) and the standardized interfaces between devices in a LTE communications system implementing DuCo.

FIG. 3B illustrates the flow of U-plane protocol data units (PDUs) and the interfaces between devices in a communications system 350 implementing DuCo. Communications system 350 includes a serving gateway (S-GW) 355 connected to a MeNB 360 and a SeNB 365. Both MeNB 360 and SeNB 365 are connected to UE 370. A portion of the data plane protocol stacks of MeNB 360 and SeNB 365 is shown in highlight 375. A data path or data plane can be split between MeNB 360 and SeNB 365 (e.g., over what is called a X2-U connection), or directly to UE 370 by a S1-U connection from MeNB 360 or SeNB 365; However, control plane signaling (not shown in FIG. 3B) can only be sent through MeNB 360 to UE 370 directly. Data PDCP PDUs for UE 370 arriving at MeNB 360 may be split, at least in part, to SeNB 365 for delivery to UE 370, or data PDCP PDUs can be sent to UE 370 directly from MeNB 360 and directly from SeNB 365. Control PDCP PDUs are sent directly from MeNB 360 to UE 370. It is noted that DuCo may be used with the example embodiments presented herein.

Figure 4:
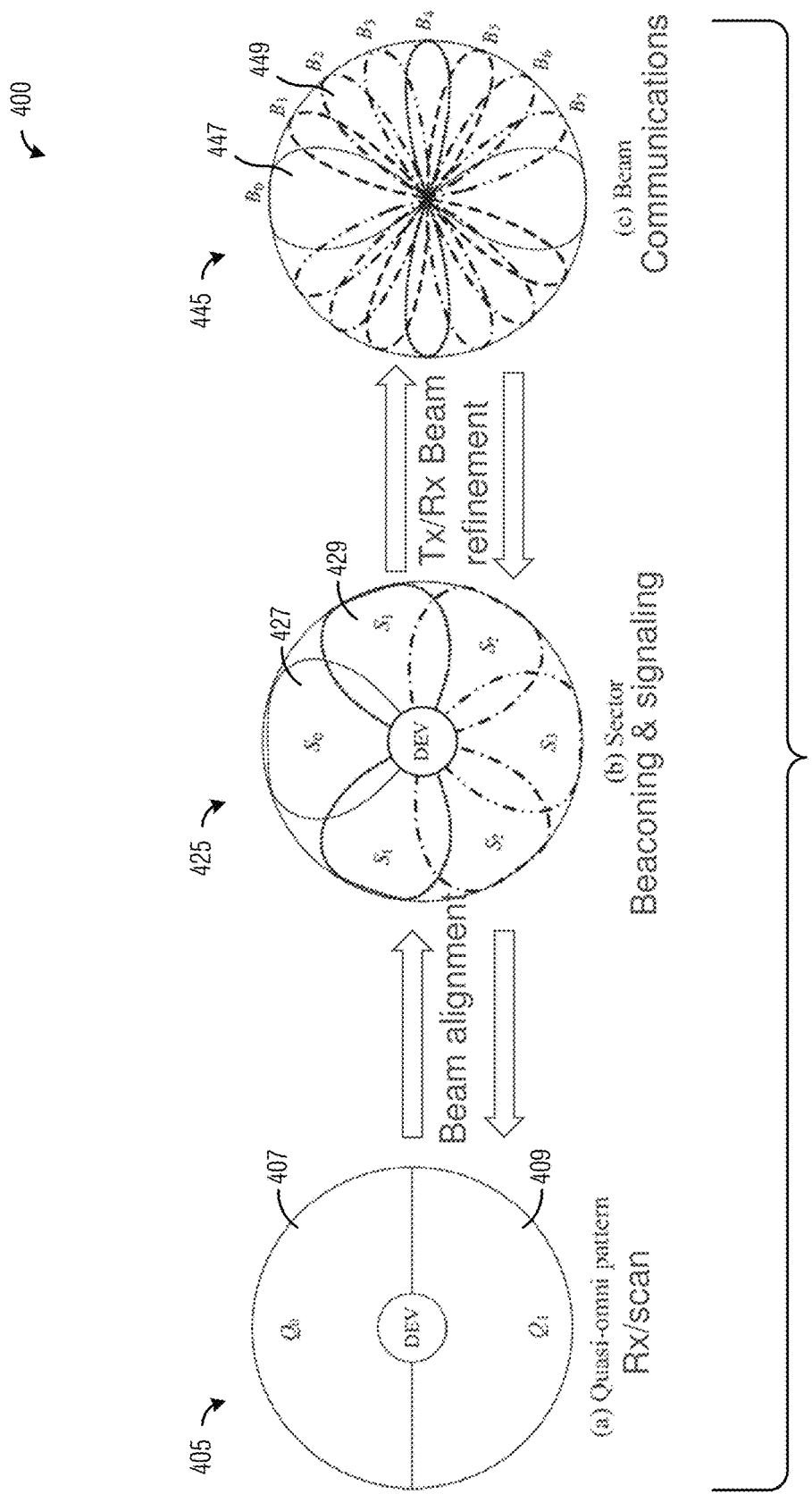
FIG. 4 illustrates communications beams of a device, highlighting examples of multi-level beamforming.

FIG. 4 illustrates communications beams 400 of a device, highlighting multilevel beamforming. Hierarchical beams or beams with different levels of beam widths are used by devices such as TRPs and UEs. The beams themselves are the physical units. Communications beams 405 represent wide beams or quasi-omni directional beams. Communications beams 405 include beams 407 and 409, with each beam having a beam width of approximately 180 degrees or more. Communications beams 425 represent medium-width beams, such as beams 427 and 429. Communications beams 445 represent narrow-width beams, such as beams 447 and 449. It is noted that within a single classification of beams, there may be beams with different beam widths. As an example, beam 447 is wider than beam 449, although both may be classified as narrow-width beams.

A device typically adopts wide or quasi-omni directional beam patterns during an initial scanning to capture the unknown direction of beams. The wide or quasi-omni directional beams may be used for wide signal coverage, efficient broadcasting, initial peer discovery, as well as mobile tracking. The device may subsequently refine the wide or quasi-omni directional beams to medium-width or narrow-width beams for higher data rate communications, for example. In general, the narrower the beam, the greater the channel gain and the better the barrier penetrating properties of the beam. Although, the wider-width beams are good for broadcasting or initial discovery/scanning, a link budget shortage may require a narrow-width beam, even for signaling or initial beaconing purposes. The narrow-width beams may make link setup difficult. In communications systems that require narrow-width beams to compensate for high loss, such as HF communications systems, a hierarchical beamforming system is often utilized to meet the different requirements of the different stages involved in communications. As an example, wide-width beams are used for initial scanning, medium-width beams are used for signaling or initial beaconing, while narrow-width beams are used for data communications.

If non-beamformed scanning is performed, a UE, detects, downlink synchronizes to, measures, and reports about received signals from a TRP. The non-beamformed scanning occurs upon power-up or in response to a trigger. The UE passively scans a list of frequency channels for a known signal, such as a 3GPP LTE synchronization signal or an IEEE 802.11 beacon, which is generally periodically broadcast by TRPs. The UE locates the best TRP or set of TRPs based on signal quality and selects a TRP to communicate with. The UE renews interrupted service or power saving (PS) mode for subsequent scanning opportunities.

Figure 5:
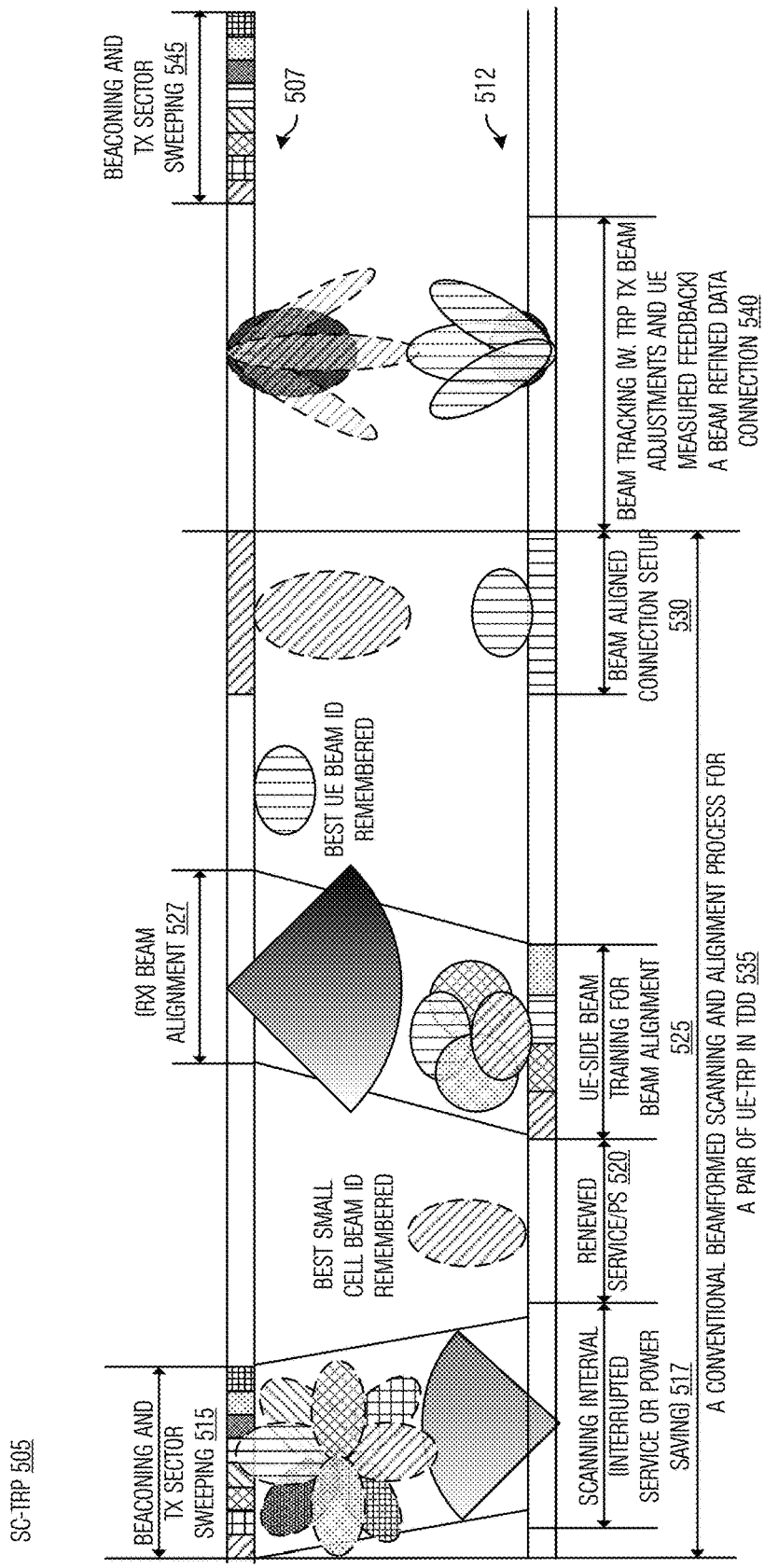
FIG. 5 illustrates a diagram of communications occurring between devices participating in a traditional beam sweeping/scanning, beam alignment, and beam tracking procedure.

FIG. 5 illustrates a diagram 500 of communications occurring between devices participating in a traditional downlink beam sweeping/scanning, beam alignment, and beam tracking procedure. Communications by a SC-TRP 505 are shown along trace 507 and communications by a UE 510 are shown along trace 512. During a beaconing and transmit sector sweeping interval 515, SC-TRP 505 transmits a beacon using transmission beams, one transmission beam at a time, for example. After transmitting the beacon using one transmission beam for a specified duration, SC-TRP 505 transmits the beacon using another transmission beam for the specified duration. SC-TRP 505 continues transmitting beacons using the transmission beams until all transmission beams have been used, covering all needed directions. In other words, SC-TRP 505 transmits the beacon for one cycle of transmission beams. UE 510 scans for the beacon transmitted by SC-TRP 505 during a scanning interval 517. UE 510 scans for the beacon using an omni directional receive antenna or receive beam. While scanning for the beacon, UE 510 may be in an interrupted service or power saving mode, which helps to reduce power consumption during scanning interval 517. During scanning interval 517, UE 510 is ensured of receiving the beacon on at least one transmission beam unless UE 510 and SC-TRP 505 are too far apart or an unforeseen error has occurred.

Once scanning interval 517 completes, UE 510 is able to determine an identifier of a transmission beam (e.g., beam ID) from SC-TRP 505 associated with the best beacon received by UE 510. As an example, the identifier of the transmission beam with the highest received signal strength, signal to noise ratio (SNR), or signal plus interference to noise ratio (SINR) is determined by UE 510. UE 510 is operating in a renewed service or power saving mode 520.

During a UE-side beam training for beam alignment interval 525, UE 510 transmits a reference signal using transmission beams, one transmission beam at a time, for example. After transmitting the reference signal using one transmission beam for a specified duration, UE 510 transmits the reference signal using another transmission beam until all transmission beams have been used. In other words, UE 510 transmits the reference signal for one cycle of transmission beams. It is noted that the number of transmission beams available to UE 510 and SC-TRP 505 usually differ, and that UE 510 normally has a smaller number of transmission beams. SC-TRP 505 scans for the reference signal transmitted by UE 510 during beam alignment interval 527. SC-TRP 505 scans for the reference signal using an omni directional receive antenna or receive beam. Once beam alignment interval 527 completes, SC-TRP 505 is able to determine an identifier of a transmission beam (e.g., beam ID) from UE 510 associated with the best reference signal received by SC-TRP 505. As an example, the identifier of the transmission beam with the highest received signal strength, SNR, or SINR is determined by UE 510. When both SC-TRP 505 and UE 510 know the identifiers of the transmission beams, the two devices have completed beam aligned connection setup 530. Intervals 515-530 are collectively referred to as conventional beamforming and alignment process 535.

After conventional beamforming and alignment process 535, SC-TRP 505 and UE 510 participate in beam refinement and beam tracking 540. In beam refinement and beam tracking 540, SC-TRP 505 makes transmission beam adjustments in order to keep track of UE 510 as UE 510 moves. SC-TRP 505 makes transmission beam adjustments in accordance with feedback provided by UE 510. As an illustrative example, UE 510 measures signals transmitted by SC-TRP 505 and feeds back the measurements or indications thereof to SC-TRP 505. As an example, UE 510 measures the signals transmitted by SC-TRP 505 and selects as a best receive beam the receive beam associated with a received signal strength that meets a threshold or one that has a better beamformed reference signal received signal strength than other receive beams. The adjustments to the transmission beam enable the refinement of the connection between SC-TRP 505 and UE 510. It is noted that adjustments to receive beams may be performed in a similar but reversed manner.

Periodically or on occurrence of an event, SC-TRP 505 repeats the downlink beaconing and transmit sector sweeping interval, such as shown in beaconing and transmit sector sweeping interval 545, and UE 510 repeats the downlink scanning interval (not shown in order to maintain simplicity in FIG. 5). The repetition of the downlink beaconing and transmit sector sweeping interval by SC-TRP 505 and the downlink scanning interval by UE 510 is interleaved with a complementary process, where UL transmissions of a beam swept reference signal are made by UE 510 so that SC-TRP 505 can conduct its own receive beam alignment process. In an entirety of the process, downlink (beam swept) beaconing and downlink (wide beam) scanning for DL beam alignment is performed, followed by UL beam alignment, for example. Examples of events that trigger the repeating of the beaconing and transmit sector sweeping interval and the scanning interval include an error rate (e.g., frame error rate, packet error rate, bit error rate, etc.) meeting an error threshold, failing to meet a Quality of Service (QoS) requirement, loss of connection between SC-TRP 505 and UE 510, UE 510 mobility resulting in a handover, UE 510 exiting the coverage area of SC-TRP 505, and so on.

The downlink-first scanning procedure illustrated in FIG. 5 may be difficult to scale for communications systems with dense TRP and UE deployments. The illustrated scanning procedure provides an example of the lengthy process for a single UE/SC-TRP pair, where beam alignment is needed due to link budget shortage. In a dense environment, the alignment process can become significantly more time and resource consuming, involving non-scalable scanning procedures for a plurality of UE/SC-TRP pairs involving the same UE.

Issues associated with downlink scanning performed by a UE in a communications system utilizing HF beamforming include:

A communications beam is a more refined physical entity and is more costly to scan than a cell. Downlink synchronization with a TRP becomes more burdensome when beamforming is used, and beam alignment is also needed. The spatial directions of the communications beams add another dimension to the already existing frequency, time, and code scanning process. In general, all beam directions of a specific TRP have to be scanned to differentiate inter-TRP handover versus intra-TRP beam switching. Furthermore, beam alignment issues complicate the scanning process, where additional link blockage means that more frequent measurements by the power-constrained UE are needed.

Downlink scanning in a HF beamforming environment involves greater Layer 1 complexity and more power and/or time consumption when compared to a LF environment without beamforming. Scanning using a sweep means that time division multiplexed (TDM) communications beam directions are needed to finish scanning each TRP. Alternatively, simultaneous scanning of multiple beam directions, which may be separated in frequency, code, or other dimensions, means that greater power consumption and complexity is required at the power-constrained UE or less directional gain is achieved.

Downlink scanning in a HF beamforming environment requires greater system level costs with TRP search and alignment than in LF small cell environments. Smaller TRP coverage areas (due to greater signal loss at HF) implies a larger number of TRPs, therefore, more frequent scans are required. UE mobility, combined with fragile beam alignment, means that there will be more radio link failures (RLFs). Therefore, more TRP selection and/or reselection are needed. Additionally, larger numbers of TRPs present in a UDN, as well as multiple connectivity demands downlink scans in even more dimensions.

Therefore, even in situations without significant UE mobility, HF channel blocking will require more UE/SC-TRP synchronization procedures and beam alignments. Conventional downlink scanning by a UE requires even more power and complexity due to the additional need to provide communications beam scanning and beam alignment. Communications beam scanning and beam alignment is also needed in initial TRP search, and connection setup. These and other factors imply that frequent UE/SC-TRP synchronization and beam alignment are needed in UDNs or high mobility deployments.

According to an example embodiment, synchronization is performed in the uplink first. As an example, a UE transmits beamformed beacons on narrow band beaconing channels to surrounding TRPs (e.g., legacy TRPs and SC-TRPs). The beacons may be coded preambles, potentially unique to each UE. The beacons are generally designed to be robust to rough timing and/or frequency synchronization. The beacon may include an uplink preamble encoded with an identifier of a transmit beam used to transmit the beamformed beacon, as well as information about the UE (such as identifier, address, and so on). The surrounding SC-TRPs use directional receive beams to scan for the narrow band beaconing channel. Some of the surrounding SC-TRPs become uplink synchronized and beam aligned with the UE. The surrounding SC-TRPs that become uplink synchronized and beam aligned with the UE may become members of a serving TRP set associated with the UE. Optionally, network assistance (from a macro layer (such as a 3GPP LTE cellular network or a New Radio (NR) network) or from other SC-TRPs) is provided to help the UE and surrounding SC-TRPs discover, align, and track each other, and/or help with the serving TRP selection. It is noted that the beacons transmitted by the UE may be transmitted without requiring downlink synchronization first or the existence of an active connection with TRPs. Although the discussion focusses on SC-TRPs, the example embodiments presented herein are also operable with legacy TRPs.

In order to facilitate the discussion of the example embodiments, the following assumptions are made:

All SC-TRPs are synchronized, whether they are standalone or network assisted.

Resources (narrow band beacon channels) are available for beaconing and scanning by the UE and the SC-TRPs.

A SC-TRP has much fewer constraints on computational resources, power, and antenna array gain than a UE in both transmit and receive.

In time division duplexing (TDD) communications systems, channel reciprocity is assumed, meaning that the best transmit beam is also the best receive beam. It is noted however, that the example embodiments presented herein are not limited to TDD, and that frequency division duplexing (FDD) may also be used.

During the beaconing and TRP search process, embodiments of the SC-TRP and UE may adopt different combinations of beamforming modes, e.g., TDM multi-level beam sweeping (MLS) or simultaneous multi-directional beamforming (MDB). As examples:

(SC-TRP, UE)=(MDB, MDB); unless explicitly noted, the MLS or MDB mode refers to both transmit and receive for the TRP or UE. For example,
SC-TRP performs MDB with multiple wide beams simultaneously for scanning or system information (SI) broadcasting.
UE performs MDB with multiple beams simultaneously to transmit bursts of short HF beacons on narrow band beaconing channels.
UE performs MDB with very wide beams for receiving low rate signals.
(SC-TRP, UE)=(MDB, MLS); a likely situation due to limited power and/or antenna resources at UE for MDB, so that at any moment, the MLS user uses no more than one beam.
(SC-TRP, UE)=(MLS, MLS).
(SC-TRP, UE)=(MLS, MDB).

It is noted that different combinations may be used for the same SC-TRP and UE pair. Some example combinations include:

After beam alignment and UE/SC-TRP association is completed, different beam refinement techniques may be used:
SC-TRP may use MDB with narrow beams for data reception or transmission after beam alignment and refinement.
SC-TRP may use a combination of MLS and MDB to determine best communications beam at certain communications beam levels.
UE may use MLS to form a single specific narrow beam with a specific SC-TRP for high data rate transmit or receive.

It is noted that the UE and SC-TRP may use MDB only if they can feasibly trade-off total power consumption for beamforming gain. Otherwise MLS may have to be used to align both the UE and SC-TRP in time, frequency, code, and space, which may be power and time consuming.

Figure 6:
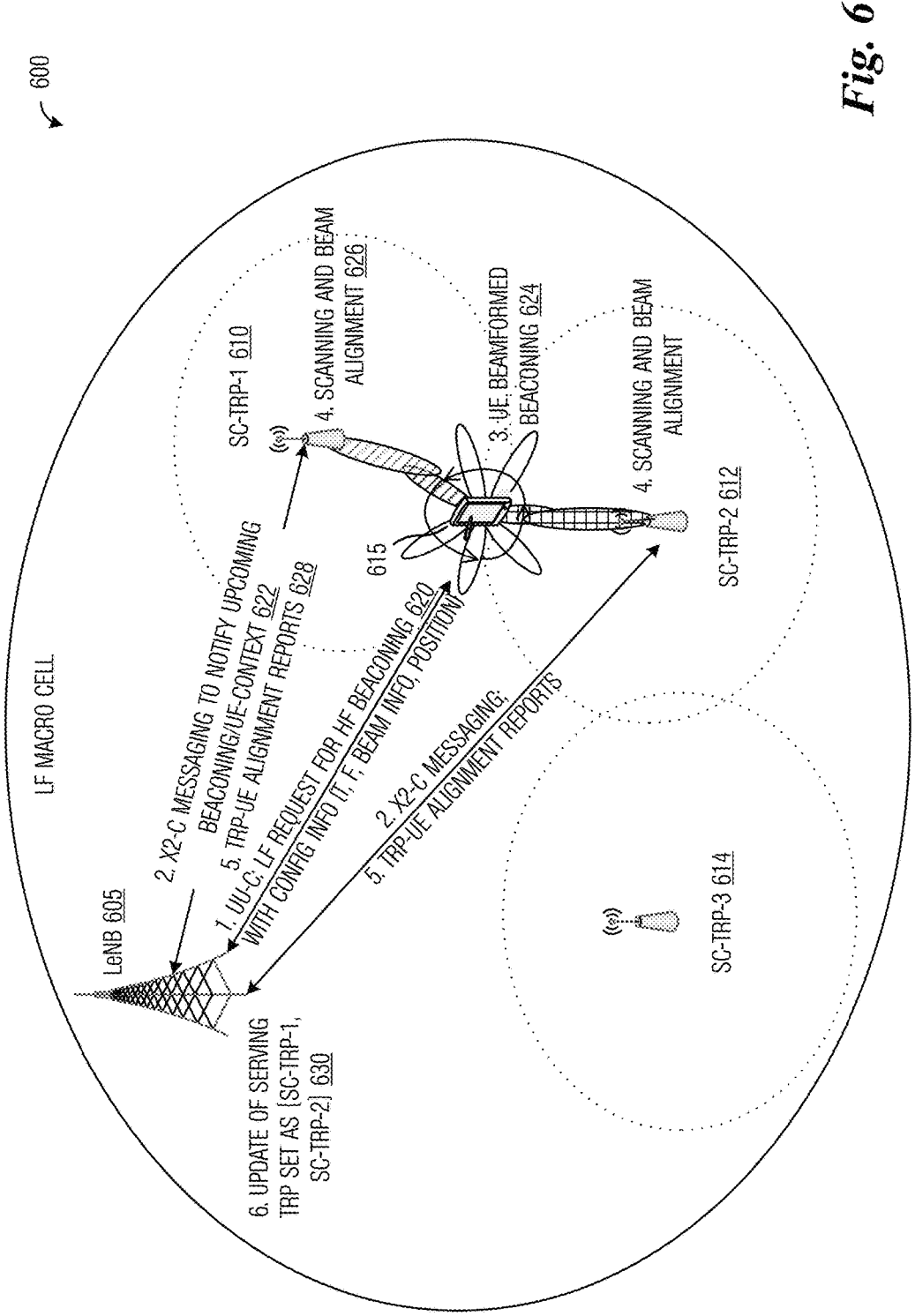
FIG. 6 illustrates an example communications system highlighting uplink synchronization by high-frequency beamformed beaconing with macro layer network-side assistance according to example embodiments described herein.

FIG. 6 illustrates an example communications system 600 highlighting uplink synchronization by high-frequency beamformed beaconing with macro layer network-side assistance. Communications system 600 includes a macro layer and a small cell layer. The macro layer of communications system 600 includes LeNBs, such as LeNB 605, providing LF coverage, while the small cell layer includes SC-TRPs, such as SC-TRPs 610, 612, and 614, providing HF coverage. LeNB 605 may include or be connected to a central controller of the SC-TRPs operating within the coverage area of LeNB 605. Communications system 600 also includes a UE 615. As shown in FIG. 6, UE is located in the coverage areas of SC-TRPs 610 and 612, as well as the coverage area of LeNB 605. LeNB 605 is able to assist the SC-TRPs operating within the coverage area of LeNB 605 to trigger UL beaconing, and/or to become uplink synchronized with UE 615. UE 615 is connected to LeNB 605.

The assistance provided by LeNB 605 may help to reduce the complexity and time associated with the uplink synchronization and beam alignment process. The assistance may be in the form of position information to identify SC-TRPs adjacent (or in close proximity) to UE 615 so that only the adjacent SC-TRPs need to participate in the uplink synchronization and beam alignment process. Furthermore, the position information may help to reduce the number of receive beams or timing used by individual SC-TRPs when receiving the beamformed beacons transmitted by UE 615. As an example, a SC-TRP uses the position information of UE 615 to eliminate receive beams that are oriented in angles opposite to an estimated location of UE 615. UE 615 may also be able to use the position information to use only those transmission beams that are oriented in the approximate directions of adjacent SC-TRPs. The assistance may also be in the form of beam information (such as beam identifiers, beam indices, and so on) to help the SC-TRPs identify the transmission beams used by UE 615.

UE 615 transmits a request to LeNB 605 requesting LeNB 605 allocate resources (along a HF narrow-band UL beacon channel, for example) to UE 615 for transmitting beamformed beacons (event 620). The request may include configuration information, such as time resource, frequency resource, beam information (such as beam pattern, beam identifiers, beam angles, and so on), and position. The position provided in the request may be optional and may be obtained through the use of a positioning system, such as the Global Positioning System (GPS), or an orthogonal mechanism. The beaconing process may be triggered by either UE 615 or LeNB 605. LeNB 605 informs the SC-TRPs operating in the coverage area of the upcoming beaconing by UE 615 (event 622). As an illustrative example, LeNB 605 may inform only the SC-TRPs adjacent to UE 615 about the upcoming beaconing. LeNB 605 is able to identify the SC-TRPs adjacent to UE 615 based on the position (or an estimate thereof) of UE 615, for example. Alternatively, LeNB 605 may inform all of the SC-TRPs operating in the coverage area about the upcoming beaconing. The informing of the SC-TRPs regarding the upcoming beaconing may involve front-haul or backhaul interfaces and messages. Although event 622 references only the messaging between SC-TRP 610 and LeNB 605, similar messaging is occurring between SC-TRP 612 and LeNB 605 and a reference numeral is not shown for that messaging to simplify FIG. 6. In general, when multiple similar operations are occurring at multiple SC-TRPs, only the operations at one SC-TRP are referenced for discussion. However, the omission of the operations occurring at the other SC-TRPs in the discussion is not intended to limit the scope or the spirit of the example embodiments.

UE 615 transmits beamformed beacons (event 624). UE 615 transmits the beamformed beacons on one or more transmission beams. If UE 615 is incapable of transmitting the beamformed beacons on all transmission beams in a single transmission, UE 615 may cycle through the transmission beams until the beamformed beacon is transmitted on all transmission beams or all of the configured transmission beams. The number of beamformed beacons UE 615 is able to transmit in a single transmission is based on the capabilities of UE 615. The beamforming directions of UE 615 may be customized depending on the capabilities of UE 615 (e.g., the presence of a gyroscope at UE 615, for example) to assist in the orientating of UE 615 towards specific beam directions of SC-TRPs.

The SC-TRPs perform scanning and beam alignment (event 626). As notified by LeNB 605, the SC-TRPs scan for the beamformed beacons transmitted by UE 615. If more than one beamformed beacons are received by a SC-TRP, the SC-TRP selects the best beamformed beacon (in terms of received signal power, SNR, or SINR, for example). The SC-TRPs determine the best transmit angle (based on the angle associated with the best receive beam, for example) or the best transmit beams used by UE 615 (based on an identifier of the transmit beam associated with the best beamformed beacon). The SC-TRPs also reports the best angle or best transmit beam identifier to LeNB 605 (event 628). The reporting may involve front-haul or backhaul interfaces and messages. LeNB 605 updates a serving set of TRPs for UE 615 based on the reports received from the SC-TRPs (event 630). LeNB 605 may continue to update the serving set of TRPs for UE 615 based on reports received from the SC-TRPs and use the information to assist the SC-TRPs in the beam tracking performed by the SC-TRPs as UE 615 moves about.

Figure 7A:
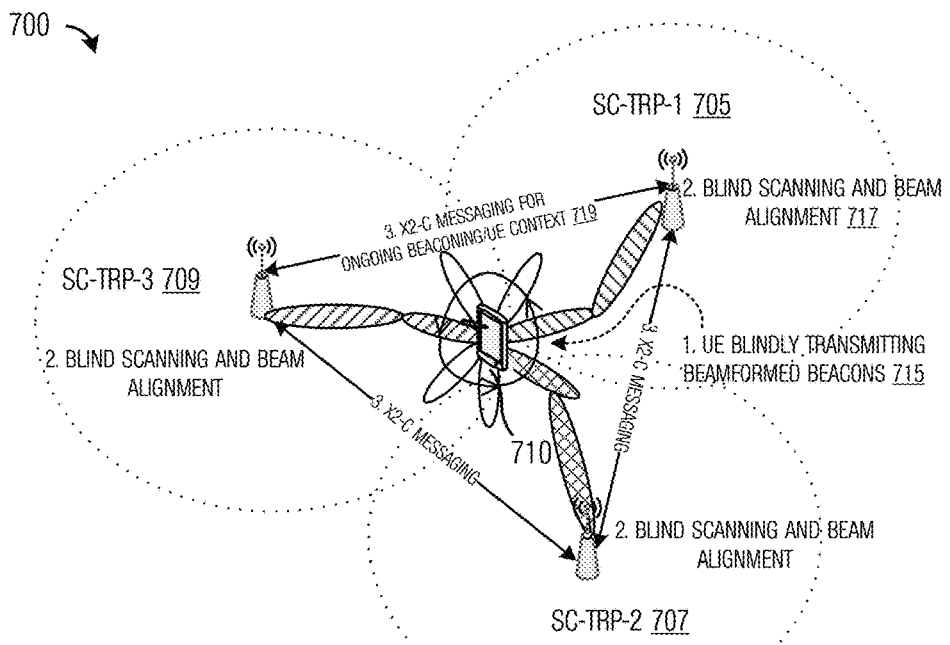
FIG. 7A illustrates an example communications system highlighting uplink synchronization without assistance according to example embodiments described herein.

FIG. 7A illustrates an example communications system 700 highlighting uplink synchronization without network-side assistance. Communications system 700 includes a small cell layer comprising SC-TRPs 705, 707, and 709. Communications system 700 also includes a UE 710. Without assistance from an informed entity, the SC-TRPs and UE 710 blindly perform uplink synchronization, with UE 710 transmitting beamformed beacons using all available transmit beams (event 715) and the SC-TRPs perform scanning and beam aligning using all available receive beams (event 717). Because no assistance is provided, all SC-TRPs of communications system 700 perform scanning and beam aligning. The SC-TRPs share results (such as beam identities, beam directions, beam indices, etc.) of the scanning and beam aligning (event 719).

Figure 7B:
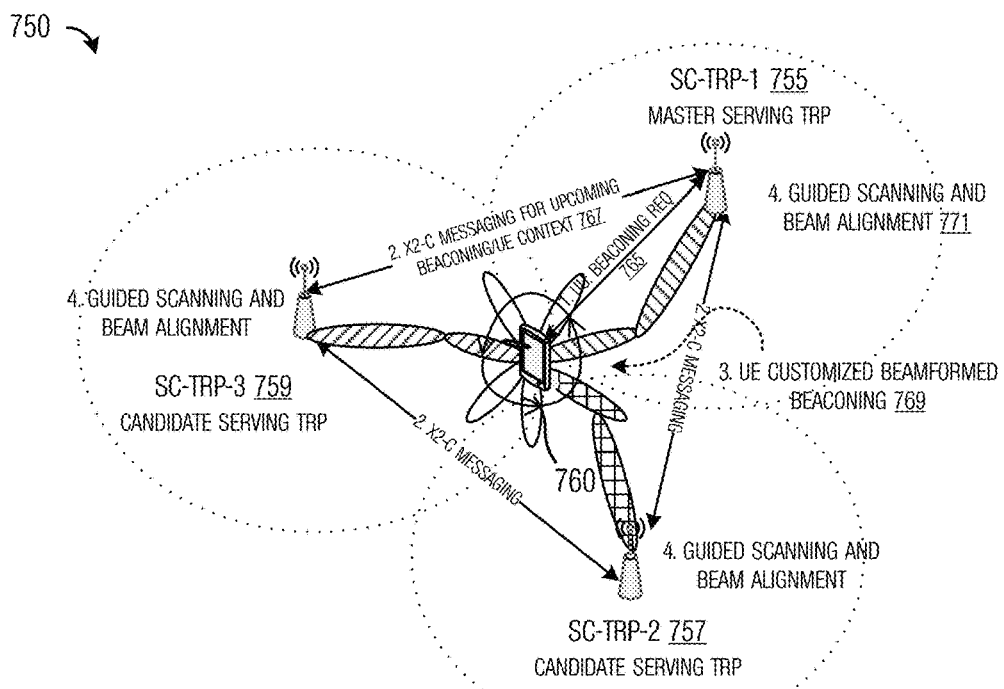
FIG. 7B illustrates an example communications system highlighting uplink synchronization with small cell layer network-side assistance according to example embodiments described herein.

FIG. 7B illustrates an example communications system 750 highlighting uplink synchronization with small cell layer network-side assistance. Communications system 750 includes a small cell layer comprising SC-TRPs 755, 757, and 759, with SC-TRP 755 operating as a master serving TRP for SC-TRPs 755, 757, and 759. Therefore, SC-TRP 755 is able to coordinate the operations of the SC-TRPs and is able to provide assistance in the uplink synchronization, in a manner similar to LeNB 605 of FIG. 6. Communications system 750 also includes a UE 760, located within the coverage areas of SC-TRPs 755, 757, and 759. UE 760 transmits a request to SC-TRP 755 requesting SC-TRP 755 allocate resources to UE 760 for transmitting beamformed beacons (event 765). The request may include configuration information, such as time resource, frequency resource, beam information (such as beam pattern, beam identifiers, beam angles, and so on), and position. SC-TRP 755 informs the SC-TRPs operating in the coverage area of the upcoming beaconing by UE 760 (event 767). As shown in FIG. 7B, SC-TRP 755 informs only the SC-TRPs 757 and 759, which are in close proximity to UE 760.

UE 760 transmits beamformed beacons (event 769). Instead of blindly transmitting beamformed beacons on all transmit beams, UE 760 is able to customize the beamformed beacons in accordance with assistance received from SC-TRP 755. As an illustrative example, UE 760 uses location information of SC-TRPs 755, 757, and 759 to only transmit beamformed beacons on transmit beams that are oriented (or closely oriented) towards SC-TRPs 755, 757, and 759. Depending upon the number of SC-TRPs involved, UE 760 may be able to significantly reduce the number of transmit beams used in transmitting beamformed beacons, thereby reducing time and resource utilization. Without the assistance from SC-TRP 755, UE 760 may have to use all transmit beams during the transmission of beamformed beacons. Similarly, SC-TRPs 755, 757, and 759 are able to perform scanning and beam aligning with assistance provided by SC-TRP 755 (event 771). As an illustrative example, the assistance provided by SC-TRP 755 includes a location estimate of UE 760, SC-TRPs 755, 757, and 759 are able to select only receive beams that cover the estimated location of UE 760 to perform scanning. Without the assistance from SC-TRP 755, SC-TRPs 755, 757, and 759 may have to use all receive beams during scanning.

Figure 8:
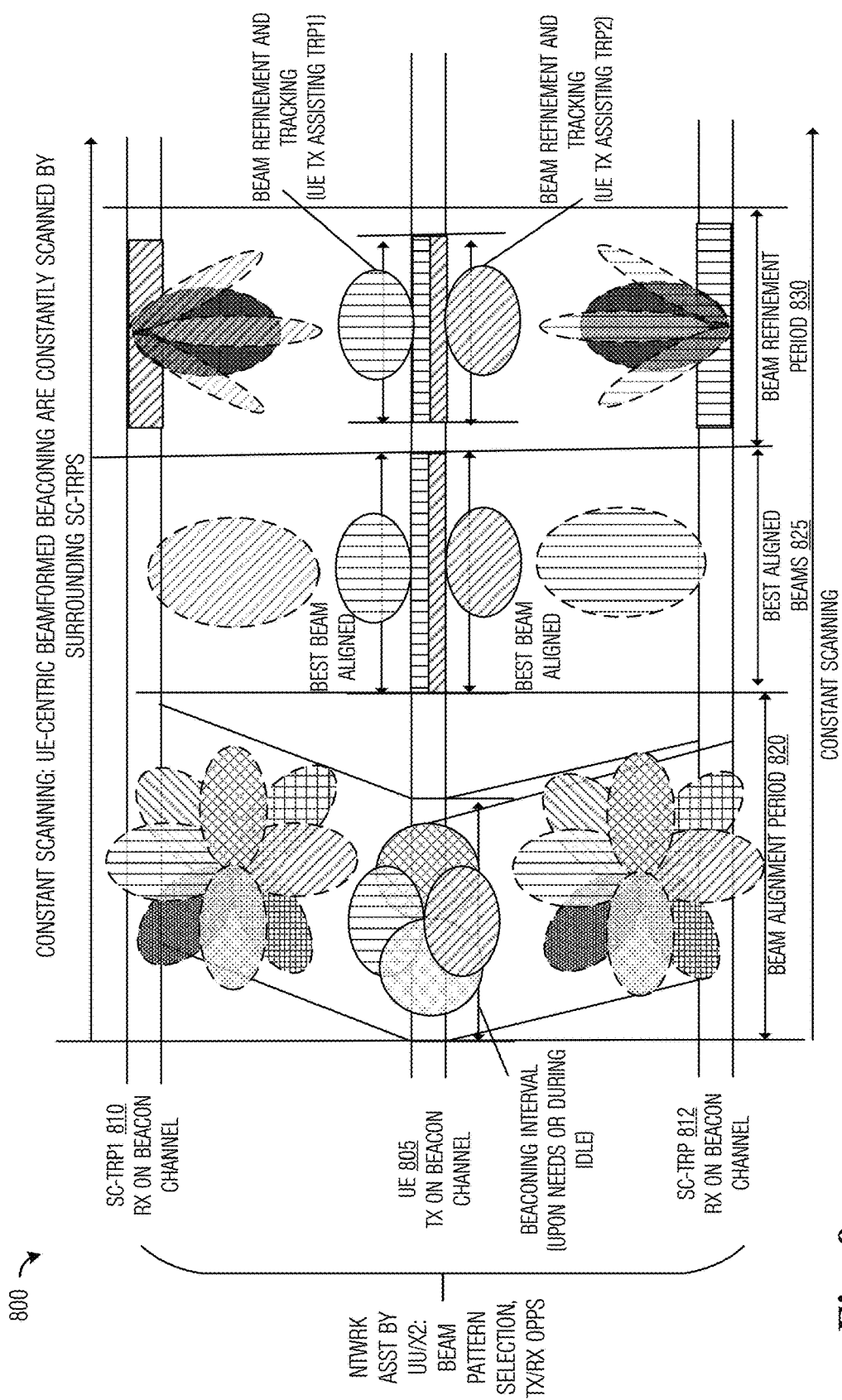
FIG. 8 illustrates a diagram of communications occurring between devices participating in a first example of UL synchronization, network-scanning, and initial beam alignment with beam refinement procedure with network-side assistance to improve overall performance according to example embodiments described herein.

FIG. 8 illustrates a diagram 800 of communications occurring between devices participating in a first example UL synchronization, network-scanning, and initial beam alignment with beam refinement procedure with network-side assistance to improve overall performance. Diagram 800 displays communications occurring at a UE 805, a SC-TRPs 810 and 812. Communications shown in FIG. 8 are configured as follows: UE 805 transmits on a unidirectional uplink beaconing channel; both UE 805 and the SC-TRPs use MDB beamforming with assistance from a network entity, such as a LeNB or a SC-TRP operating as a serving SC-TRP.

During a beam alignment period 820, UE 805 transmits beamformed beacons on a beaconing channel, where UE 805 transmits the beamformed beacons simultaneously on transmit beams selected in accordance with information provided by the network entity. Also during beam alignment period 820, SC-TRPs 810 and 812 are scanning for the beamformed beacons transmitted by UE 805 using simultaneous receive beams selected in accordance with the information provided by the network entity. The information provided by the network entity assists the devices by potentially eliminating communications beams (i.e., transmit beams and receive beams) that are not oriented towards the devices with which they are communicating. After beam alignment period 820, UE 805 and SC-TRPs 810 and 812 have best aligned beams 825. The network entity obtains information from UE 805 and SC-TRPs 810 and 812 regarding best aligned beams 825 and provides at least some of the information to UE 805 and SC-TRPs 810 and 812. As an example, the network entity informs UE 805 which of the transmit beams of UE 805 are received by specific SC-TRPs using which specific receive beam.

Although best aligned beams 825 are the transmit and received beams of UE 805 and SC-TRPs 810 and 812 correspond to communications beams that resulted in highest signal strength, for example, it may still be possible to refine the communications beams. As an illustrative example, it is possible to decrease the beam width of the communications beams to improve link budget. Furthermore, due to UE mobility, the orientation of the communications beams may need to be adjusted to ensure that the best aligned beams remain the best beams. During a beam refinement period 830, SC-TRPs 810 and 812 continue to refine their respective receive beams based on assistance from UE 805. SC-TRPs 810 and 812 may decrease the beam width of their receive beams and/or alter the orientation of their receive beams by measuring signals or uplink beacons transmitted by UE 805. As an example, UE 805 transmits sounding reference signals (SRS), beacons, or other signaling to assist SC-TRPs 810 and 812. UE 805 may also adjust its transmit beams based on the reception of signals transmitted by SC-TRPs 810 and 812 to ensure that the best receive beams are being used. A technique similar to the beaconing and information sharing used during beam alignment period 820 may be used during beam refinement period 830.

Figure 9:
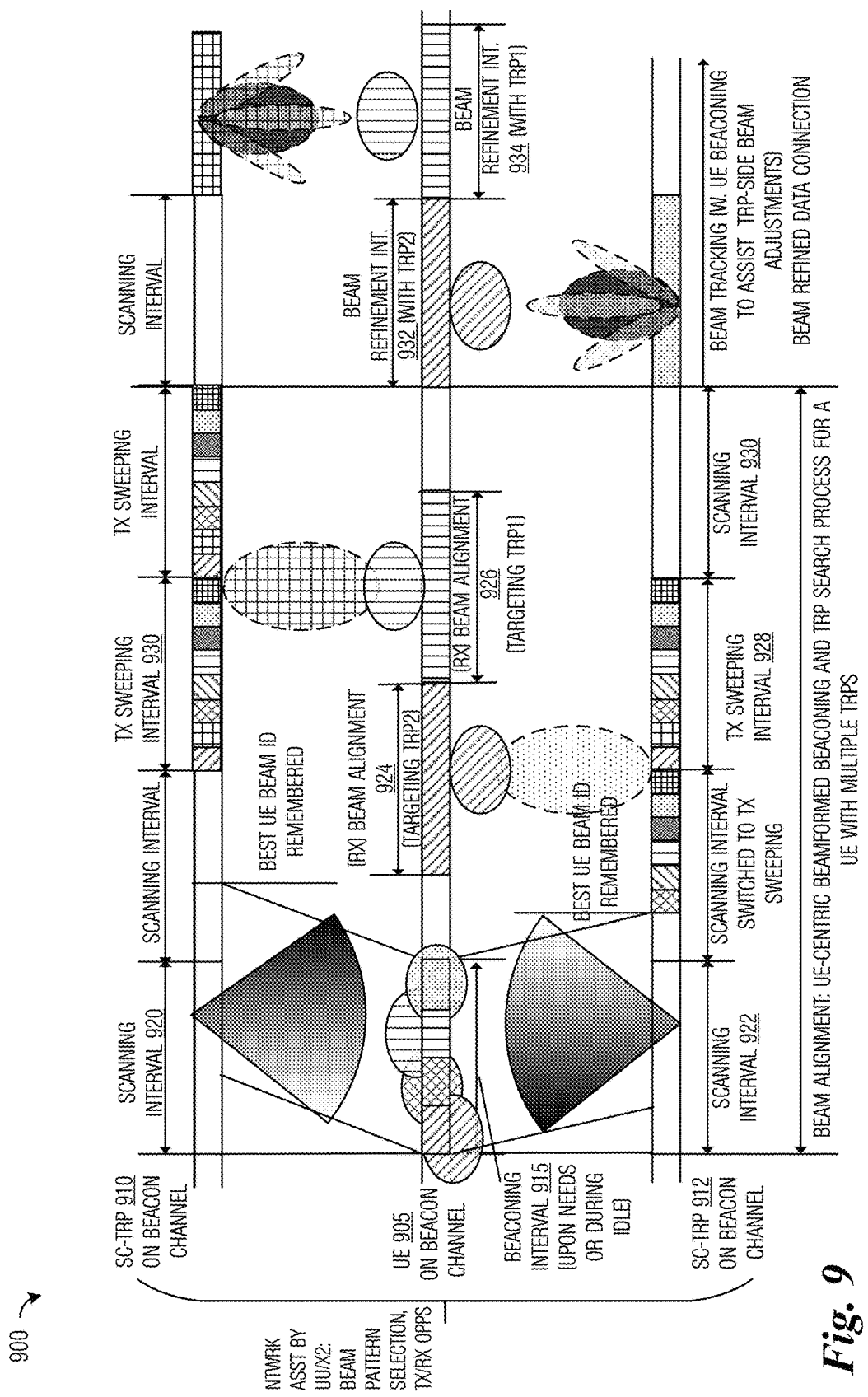
FIG. 9 illustrates a diagram of communications occurring between devices participating in a second example of UL synchronization, network scanning, and beam alignment with beam refinement procedure with network-side assistance to improve overall performance according to example embodiments described herein.

FIG. 9 illustrates a diagram 900 of communications occurring between devices participating in a second example of UL synchronization, network scanning, and beam alignment with beam refinement procedure with network-side assistance to improve overall performance. Diagram 900 displays communications occurring at a UE 905, a SC-TRPs 910 and 912. Communications shown in FIG. 9 are configured as follows: UE 905 transmits on a half-duplex bidirectional beaconing channel; both UE 905 and the SC-TRPs use MLS beamforming by sweeping through all beam directions in a TDM manner with assistance from a network entity, such as a LeNB or a SC-TRP operating as a serving SC-TRP.

During a beacon interval 915, UE 905 transmits beamformed beacon signals in a beacon channel with transmit beams. UE 905 may be able to reduce the number of transmit beams used based upon assistance provided by the network entity. As an example, the transmit beams that are oriented towards SC-TRPs 910 and 912 are selected based on location information provided by the network entity. In scanning interval 920, SC-TRP 910 scans for the beamformed beacons transmitted by UE 905 in the beacon channel and in scanning interval 922, SC-TRP 912 scans for beamformed beacons transmitted by UE 905 in the beacon channel. SC-TRPs 910 and 912 may use wide receive beams while scanning for the beamformed beacons. Both SC-TRPs 910 and 912 may be able to reduce the number of receive beams used in scanning based upon assistance provided by the network entity. SC-TRPs 910 and 912 record identifiers of the best transmit beams used by UE 905. The best beams and/or information about the best beams are shared with the network entity, which may subsequently provide the information (or some of the information) to the other devices. In addition to the best beam and/or best beam information, the network entity may also have knowledge of the locations (or estimates thereof) of the devices. The network entity may also be provided information about channel usage, e.g., scheduling transmit and/or receive opportunities of the beacon channel.

UE 905 begins individual beam alignment processes with SC-TRPs 910 and 912, allowing UE 905 to determine best transmit beams for each SC-TRP. In a first beam alignment interval 924, UE 905 receives signals transmitted by SC-TRP 912 to determine a best transmit beam for SC-TRP 912. UE 905 uses a best receive beam as determined from a best transmit beam of UE 905 determined by SC-TRP 912 in scanning interval 922. Similarly, in a second beam alignment interval 926, UE 905 receives signals transmitted by SC-TRP 910 to determine a best transmit beam for SC-TRP 910. UE 905 uses a best receive beam as determined from a best transmit beam of UE 905 determined by SC-TRP 910 in scanning interval 920. During beam alignment intervals 924 and 926, SC-TRPs 912 and 910 perform transmit beam sweeping 928 and 930, respectively. Transmit beam sweeping involves the SC-TRP to transmit signals, such as a reference signal, using different transmit beams. The transmit beams used may be selected in accordance with assistance from the network entity. As an example, the transmit beams that are oriented towards UE 905 are selected based on location information provided by the network entity.

UE 905 and SC-TRPs 910 and 912 perform beam refinement. In a first beam refinement interval 932, UE 905 transmits signals, such as uplink beacons or SRS, to SC-TRP 912. The signals allow SC-TRP 912 to refine transmit beams, such as alter the orientation or change the beam width, in accordance with the received signals. As an illustrative example, SC-TRP 912 determines a best receive beam that maximizes the received signals (received signal strength, SNR, SINR, and so on) and uses the best receive beam to determine the best transmit beam. Similarly, in a second beam refinement interval 934, UE 905 transmits signals to SC-TRP 910, allowing SC-TRP 910 to refine transmit beams in accordance with the received signals.

Figure 10:
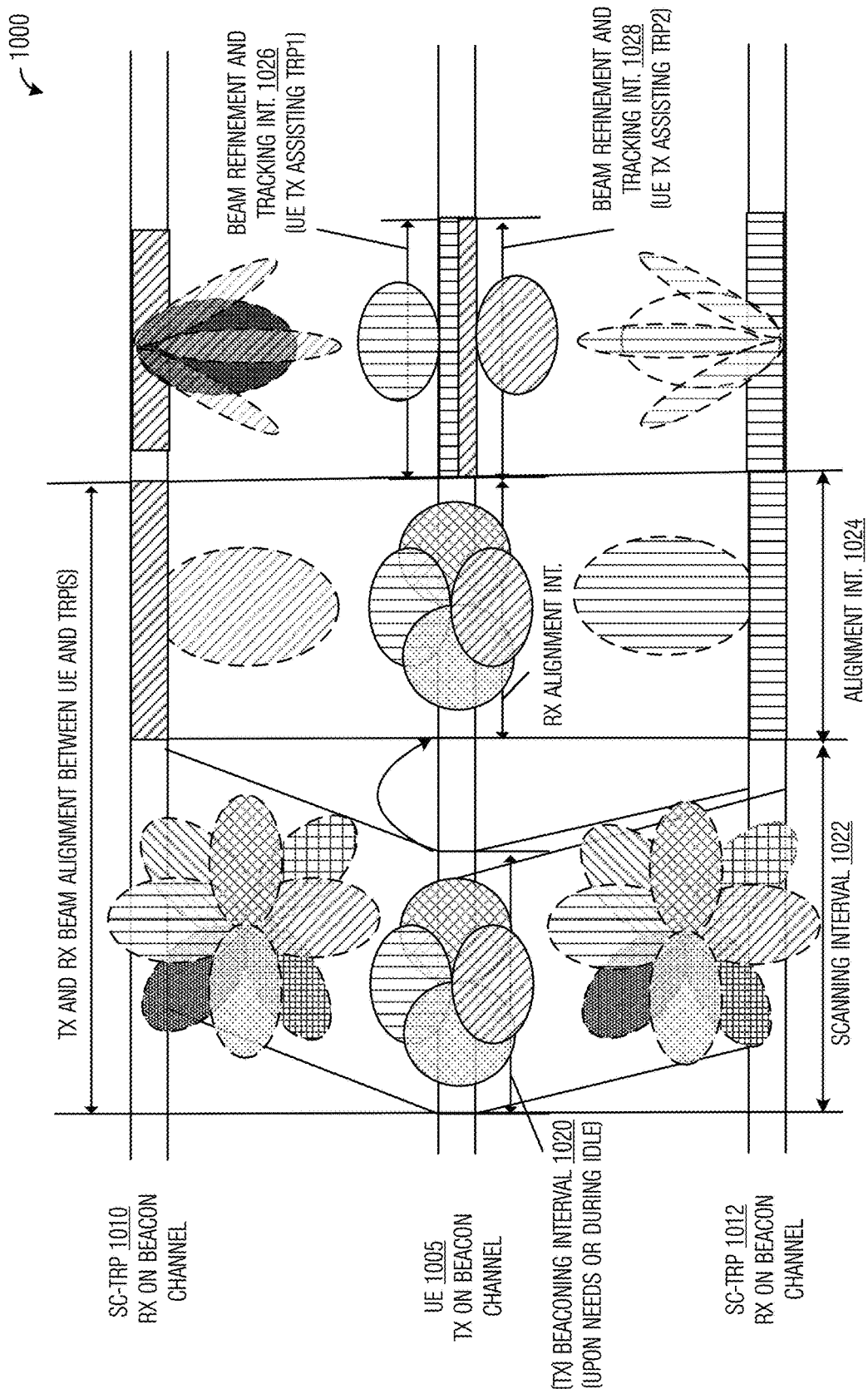
FIG. 10 illustrates a diagram of communications occurring between devices participating in a third example of UL synchronization, network scanning, and beam alignment with beam refinement and tracking procedure without any network-side assistance according to example embodiments described herein.

FIG. 10 illustrates a diagram moo of communications occurring between devices participating in a third example UL synchronization, network scanning, and beam alignment with beam refinement and tracking procedure without any network-side assistance. Diagram moo displays communications occurring at a UE 1005, and SC-TRPs low and 1012. Communications shown in FIG. 10 are configured as follows: UE 1005 transmits on a half-duplex bidirectional beaconing channel; both UE 1005 and the SC-TRPs 1010 and 1012 use MDB beamforming without assistance from a network entity.

During a beacon interval 1020, UE 1005 transmits beamformed beacon signals in a beacon channel with transmit beams. Because UE 1005 does not have assistance from a network entity with knowledge such as SC-TRP location, etc., UE 1005 performs blind beaconing and transmits the beamformed beacon signals on all transmit beams. In a scanning interval 1022, SC-TRPs low and 1012 scan for beamformed beacons transmitted by UE 1005 in the beacon channel. SC-TRPs 1010 and 1012 use all receive beams in a cyclic manner because assistance from a network entity is not available. SC-TRPs low and 1012 are able to determine best receive beams for UE 1005.

During an alignment interval 1024, which may start at a moment indicated to UE 1005 and SC-TRPs low and 1012 in the previous process, SC-TRPs low and 1012 transmit signals, such as reference signals, using best transmit beams that correspond to the best receive beams found during beacon interval 1020, and scanning interval 1022. While SC-TRPs low and 1012 are transmitting signals, UE 1005 also perform beam alignment by using different receive beams to receive the signals transmitted by SC-TRPs 1010 and 1012. Because assistance from a network entity is not available, UE 1005 does not know the best transmit beams of SC-TRPs low and 1012, nor the locations of SC-TRPs low and 1012. Therefore, UE 1005 uses all receive beams to receive the signals transmitted by SC-TRPs 1010 and 1012. UE 1005 is able to determine the best receive beams for SC-TRPs low and 1012 based on measurements of the signals transmitted by SC-TRPs low and 1012.

During beam refinement and tracking intervals 1026 and 1028, UE 1005 transmit signals, such as beacons or SRS, on best transmit beams for SC-TRPs low and 1012, respectively. The best transmit beams for SC-TRPs low and 1012 may be determined from the best receive beams for SC-TRPs low and 1012. SC-TRPs low and 1012 adjust their receive beam orientations or beam widths based on the received signals.

Figure 11:
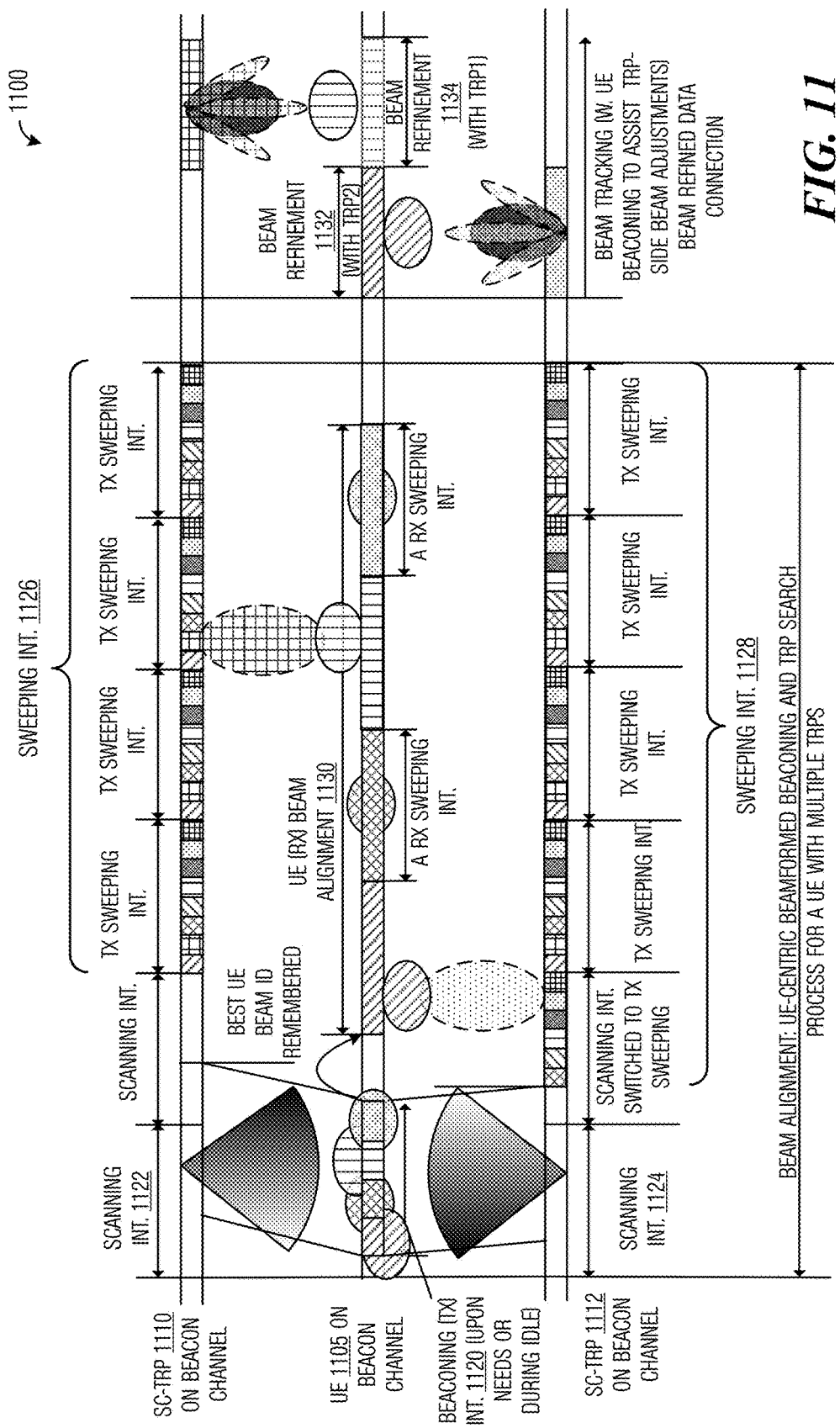
FIG. 11 illustrates a diagram of communications occurring between devices participating in a fourth example of UL synchronization, network scanning, and beam alignment with beam refinement and tracking procedure without any network-side assistance according to example embodiments described herein.

FIG. 11 illustrates a diagram 1100 of communications occurring between devices participating in a fourth example UL synchronization, network scanning, and beam alignment with beam refinement and tracking procedure without any network-side assistance. Diagram 1100 displays communications occurring at a UE 1105, as well as SC-TRPs 1110 and 1112. Communications shown in FIG. 11 are configured as follows: UE 1105 transmits on a half-duplex bidirectional beaconing channel; both UE 1105 and the SC-TRPs use MLS beamforming without assistance from a network entity, such as a LeNB or a SC-TRP operating as a serving SC-TRP. It is noted that without assistance, the reverse direction beam alignment is needed, with UE 1105 beaconing first and the SC-TRPs determining the best beams for UE 1105 and then UE 1105 perform receive scanning to help the SC-TRPs sweep and determine the best beams for the SC-TRPs. As shown in FIG. 11, the sweeping interval is equal to the scanning interval.

During a beacon interval 1120, UE 1105 transmits beamformed beacon signals in a narrow-band beacon channel with transmit beams. Because UE 1105 does not have assistance from a network entity with knowledge such as SC-TRP location, etc., UE 1105 performs blind beaconing and transmits the beamformed beacon signals on all transmit beams. SC-TRPs 1110 and 1112 may use wide receive beams while scanning for the beamformed beacons. SC-TRPs 1110 and 1112 use wide receive beams with wide beam widths to reduce scanning time, for example. Because SC-TRPs 1110 and 1112 do not have assistance from a network entity with knowledge such as UE location, etc., SC-TRPs 1110 and 1112 perform blind scanning and uses all receive beams. SC-TRPs 1110 and 1112 record identifiers of best transmit beams used by UE 1105.

UE 1105 begins individual beam alignment processes with SC-TRPs 1110 and 1112, allowing UE 1105 to determine best transmit beams of each SC-TRP. In a first sweeping interval 1126, SC-TRP 1110 performs transmit beam sweeping wherein SC-TRP 1110 transmits signals, such as reference signals, using different transmit beams. Similarly, in a second sweeping interval 1128, SC-TRP 1112 performs transmit beam sweeping. UE 1105 performs a beam alignment process 1130 wherein UE 1105 scans using receive beams to receive transmitted signals from SC-TRPs 1110 and 1112. As an illustrative example, UE 1105 performs a beam alignment process with SC-TRP 1112 and is able to determine a best receive beam associated with SC-TRP 1112 and then UE 1105 performs a beam alignment process with SC-TRP 1110 and is able to determine a best receive beam associated with SC-TRP 1110.

UE 1105 and SC-TRPs 1110 and 1112 perform beam refinement. In a first beam refinement interval 1132, UE 1105 transmits signals, such as beacons or SRS, to SC-TRP 1112. The signals allow SC-TRP 1112 to refine transmit beams, such as alter the orientation or change the beam width, based on measurements made on the received signals from UE 1105. Similarly, in a second beam refinement interval 1134, UE 1105 transmits signals to SC-TRP 1110, allowing SC-TRP 1110 to refine transmit beams in accordance with the received signals from UE 1105.

According to an example embodiment, a dedicated beaconing channel is provided. The dedicated beaconing channel may either be scheduled by a network entity (such as a LeNB or a SC-TRP operating as a serving SC-TRP, for example) or accessed using contention. Transmissions on the dedicated uplink beaconing channel are beamformed (spatially multiplexed). The beaconing may be performed using one or more narrow band channels that are typically reserved for beaconing only and are known to both the UEs and the SC-TRPs. The narrow band channels may be FDM with other channels, such as data and/or control. The narrow band channels in the uplink situation are scanned by the SC-TRPs.

Figure 12:
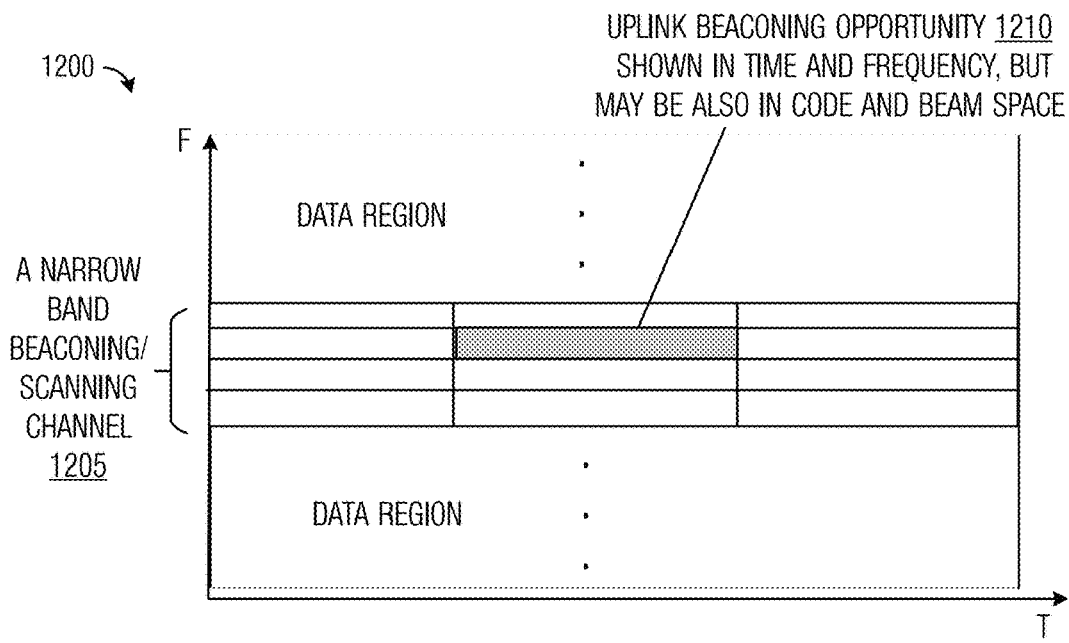
FIG. 12 illustrates a diagram of a narrow-band uplink beaconing channel defined by network resources (in time, frequency, code, and beam space) in a high-frequency band according to example embodiments described herein.

FIG. 12 illustrates a diagram of narrow-band uplink beaconing channel defined by network resources 1200 (in time, frequency, code, and beam space) in a high-frequency band. Located in network resources 1200 is a plurality of network resources reserved as dedicated beaconing channels 1205. One or more the plurality of network resources is highlighted as an uplink beaconing opportunity 1210. Uplink beaconing opportunity 1210 is shown as comprising time and frequency resources, however, a beaconing opportunity can also comprise code and/or spatial resources.

According to an example embodiment, the beaconing channels are used to carry downlink and/or uplink beacons. As an example, SC-TRPs can transmit downlink signals for beam alignment, beam refinement, beam tracking, and so on, purposes and UEs can transmit uplink beacons. In such a situation, separate downlink beacon resources may not be necessary.

According to another example embodiment, the beaconing channel is a half-duplex narrow band channel with the uplink and downlink being multiplexed in time. According to another example embodiment, the beaconing channel is full-duplex with separate downlink and uplink sub-channels (a first narrow band sub-channel is reserved for only downlink beaconing and a second narrow band sub-channel is reserved for only uplink beaconing). The separate sub-channels may be on the same band (using time division duplexing) or different bands (using frequency division duplexing), which allows for beaconing and other downlink responses.

According to an example embodiment, the beaconing channel is defined in a manner similar to the 3GPP LTE physical random access channel (PRACH), i.e., with time, frequency, and code resources along with a contention resolution mechanism to accommodate potential uplink collisions by multiple UEs simultaneously transmitting beacons. However, usage of the beacon channels may not require any a priori downlink scanning and/or synchronization, as PRACH does, and may be scheduled by a network entity. Alternatively, the beacons may be spatially separated and multiplexed by beamforming. In such a scenario, downlink responses for contention resolution may not be required, which may be the case if the beacons are transmitted on other channels.

It is noted that after the beaconing is complete, the SC-TRPs and the UEs are aligned and the channels may be used using the same beams determined through the beaconing process for subsequent data communications with the possibility of beam tracking and beam refinement over the channels.

Figure 13:
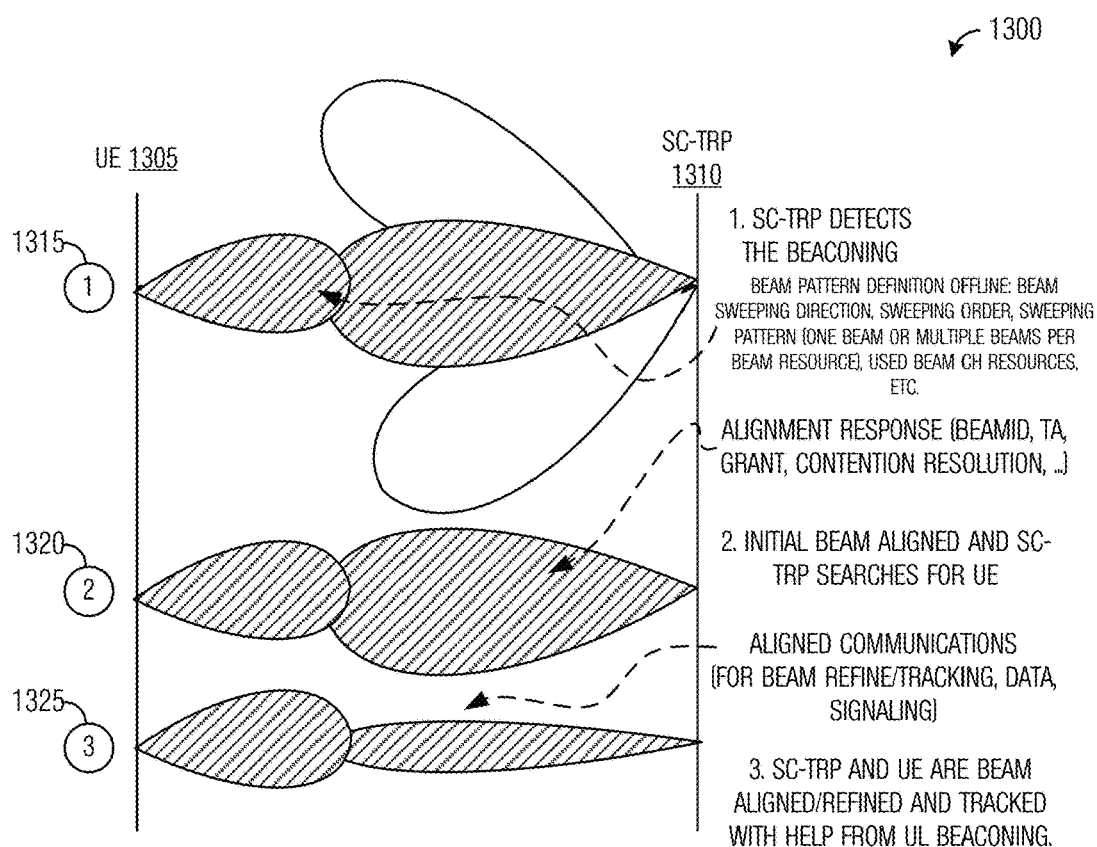
FIG. 13 illustrates an example beam alignment and beam refinement/tracking flow utilizing uplink beaconing according to example embodiments described herein.

FIG. 13 illustrates an example beam alignment flow 1300 utilizing uplink beaconing. The beam alignment involves transmissions and receptions by a UE 1305 and a SC-TRP 1310. In a first step 1315, a beaconing process may begin (without any downlink scanning or downlink synchronization by UE 1305 with SC-TRP 1310) with UE 1305 transmitting uplink beacons either contentiously or blindly without assistance from a network entity. Alternatively, UE 1305 may transmit uplink beacons in a scheduled manner with network assistance. In a second step 1320, in an example embodiment, because uplink beaconing in first step 1315 only helps SC-TRP 1310 align specific receive beams with specific transmit beams of UE 1305, a downlink beam alignment is performed either explicitly on the same channel (with downlink tracking signaling or data) as shown in FIG. 13 or with assistance of a network entity or with other non-beaconing channels. In a third step 1325, in an example embodiment, beam refinement and beam tracking is performed on the same beaconing channel (uplink or downlink, half-duplex or full-duplex as discussed previously) with on-demand or UE controlled burst transmission of uplink beacons (as shown in FIG. 13). However, the beam refinement and beam tracking may be performed using non-beaconing channels, as is done in other techniques. The steps 1315-1325 apply to communications systems using TDD or FDD.

In steps 1315-1325, in an example embodiment, a three-way handshake occurs on a single beaconing channel for the SC-TRP search, beam alignment, and device tracking. It is noted that given a bi-directional beaconing channel, the uplink and the downlink beamformed connections may be tracked and maintained in Layer 1 and/or Layer 2, as discussed in third step 1325.

As discussed previously, UE uplink beaconing may occur without downlink synchronization or scanning of SC-TRPs. UE uplink beaconing takes place with or without assistance from a network entity. Initial assistance from a network entity may provide a coarse level of system information, such as SC-TRP context for the UE. It is possible to combine the network assisted beam alignment mechanism with other beaconing mechanisms.

A UE uses either simultaneous wide beams or beam sweeping with TDM to transmit a low rate in multiple directions, e.g., short bursts of uplink beaconing. The burst transmission of uplink beacons occurs infrequently: upon requirements of the UE or network; mobility, traffic, or channel context changes, and so on. The trigger of the uplink beacon transmissions is known only to the UE. The uplink beacon transmissions occurs on a narrow band channel, with one example embodiment combining the uplink beacon channel with data channels using FDM on a frequency band of a TDD communications system. Collisions may occur when multiple UEs transmit to the same SC-TRP using the same beaconing channel opportunities if uplink beacons are transmitted without network assisted scheduling. A contention resolution similar to the technique used with 3GPP LTE PRACH preambles may be used to resolve uplink beacon contention.

The SC-TRPs continually scan the narrow band beaconing channel to receive the UE uplink beacons. If a SC-TRP successfully receives an uplink beacon from a UE, the UE/SC-TRP pair can pursue beam alignment. If the SC-TRP becomes aligned with the UE through a reliable beamformed channel and signal, the SC-TRP may be added to a serving set of TRPs for the UE on the network side for UE/SC-TRP association. The SC-TRP, already in the serving set of TRPs for the UE, can monitor the beaconing channel and refine a beam towards the UE.

According to an example embodiment, the uplink narrow band beaconing channel is frequency multiplexed with a data channel. The frequency multiplexing of the uplink narrow band beaconing channel has little impact to SC-TRPs because SC-TRPs are usually monitoring channels for UE uplink beaconing without concern for power consumption. With respect to UEs, the frequency multiplexing of the uplink narrow band beaconing channel with a data channel allows the UE to transmit uplink beacons immediately when the need arises, based on a schedule, or when the UE is idle. The beaconing can be of sufficient duration for the SC-TRP to synchronize with and decode the beacon.

According to an example embodiment, the uplink beacon has the following format to support beacon detection. The beacon follows the format of a preamble to enable easy detection matching, with a beam pattern (e.g., identifier) and UE identifier implicitly embedded. A randomized or ordered sweeping of direction of the beams in each scanning interval, for example, to avoid synchronized misses of the beacons. Repetitions of beam directions, interleaved (beam 1, beam 2, . . . , beam 1, beam 2, . . . ) or contiguous (beam 1, beam 1, beam 1, beam 2, beam 2, beam 2, . . . ), for example.

According to an example embodiment, the beaconing channel remains useful even after the beacon has been detected. If the beaconing channel is bi-directional, a message similar to a random access response (RAR) alignment message may be sent by the SC-TRP for timing advance (uplink synchronization) and further UE/SC-TRP downlink synchronization. Otherwise, the beaconing channel can be combined with other downlink signaling channels. Connection setup, if needed, follows with an exchange of signaling messages, which may be transmitted over the beaconing channel (bi-directional) or other channels. Beam refinement and beam tracking may be performed with the assistance of the UE, e.g., by transmitting short bursts of the uplink beacon on the beaconing channel.

Figure 14A:
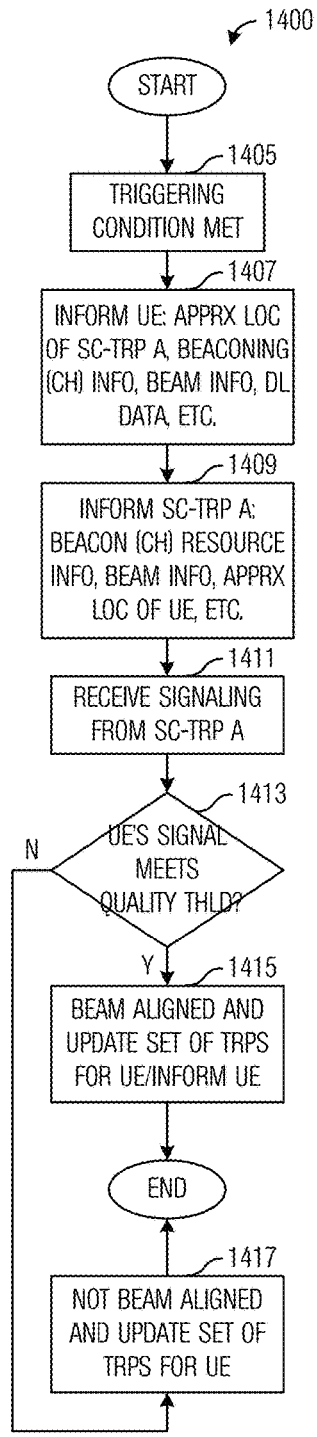
FIG. 14A illustrates a flow diagram of example operations occurring in a (macro-layer or serving TRP based) network device participating in network assisted uplink beacon, (TRP-based) network-side beacon scanning, beam alignment to refinement and tracking, and serving TRP selections according to example embodiments described herein.

FIG. 14A illustrates a flow diagram of example operations 1400 occurring in a network device participating in network assisted beacon scanning and beam alignment. Operations 1400 may be indicative of operations occurring in a (macro-layer or serving TRP based) network device participating in network assisted uplink beacon, (TRP-based) network-side beacon scanning, beam alignment to refinement and tracking, and serving TRP selections.

Operations 1400 begin with the network device determining that a triggering condition is met (block 1405). Examples of a triggering condition include the arrival or presence of downlink data for a UE at the network device, the UE is approaching a potential SC-TRP, such as SC-TRP A, for services, and so on. The SC-TRP A is a member of a candidate list of the UE. The network device provides assistance to the UE in the form of information (block 1407). Examples of the information provided by the network entity include an approximate location of SC-TRP A, network resource (e.g., beaconing channel) information, beaconing information (such as beaconing sequence, beaconing frequency, beaconing duration, and so on), availability of downlink data, beam information of SC-TRP A, and so on. The network device provides assistance to the SC-TRP A in the form of information (block 1409). Examples of the information provided by the network entity include network resource (e.g., beaconing channel) information, beam information of the UE, an approximate location of the UE, and so forth. The network entity receives signaling from the SC-TRP A (block 1411). The signaling from the SC-TRP A may include an indication of the signal quality of the UE, best beam information (such as beam index or beam identifier) for best receive beam of SC-TRP A and best transmit beam of the UE, etc. In a TDD communications system, the best beam information provided by the SC-TRP A also corresponds to the best transmit beam of SC-TRP A and the best receive beam of the UE.

The network entity performs a check to determine if the signal quality of the UE, as reported by the SC-TRP A, meets a quality threshold (block 1413). The quality threshold may be a value specified in a technical standard or by an operator of the communications system. Alternatively, the devices in the communications system may determine the quality threshold based on the conditions of the communications system, such as error rate, channel quality, channel measurements, network traffic, and so on. If the signal quality of the UE meets the quality threshold, the UE and the SC-TRP A is considered to be beam aligned and the network entity adds the SC-TRP A to the set of TRPs serving the UE (block 1415). The network entity also informs the UE about the addition of the SC-TRP A to the set of TRPs. The UE may be provided information about the best beams provided by the SC-TRP A. If the signal quality of the UE does not meet the quality threshold (block 1413), the SC-TRP A is removed from the candidate list of the UE and the UE and the SC-TRP A are not considered to be beam aligned.

Figure 14B:
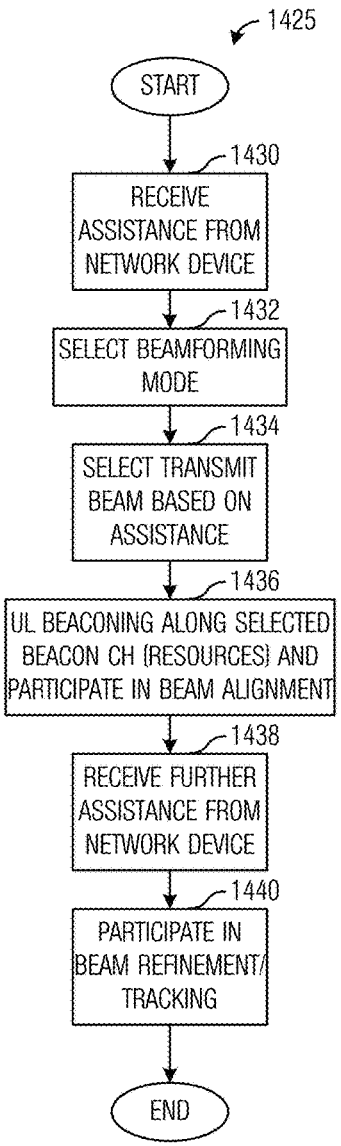
FIG. 14B illustrates a flow diagram of example operations occurring in a UE participating in network assisted uplink beacon, network scanning, beam alignment to refinement and tracking, and serving TRP selections according to example embodiments described herein.

FIG. 14B illustrates a flow diagram of example operations 1425 occurring in a UE participating in network assisted beacon scanning and beam alignment. Operations 1425 may be indicative of operations occurring in a UE participating in network assisted uplink beacon, network scanning, beam alignment to refinement and tracking, and serving TRP selections.

Operations 1425 begin with the UE receiving assistance in the form of information from a network device (block 1430). Examples of the information provided by the network entity include an approximate location of SC-TRP A, network resource (e.g., beaconing channel) information, beaconing information (such as beaconing sequence, beaconing frequency, beaconing duration, and so on), availability of downlink data, beam information of SC-TRP A, and so on. The UE selects a beamforming mode (block 1432). The beamforming mode may be MLS or MDB, for example. The UE selects one or more transmit beams in accordance with the assistance provided by the network entity (block 1434). As an illustrative example, out of a plurality of transmit beams, the UE is able to select one or more transmit beams that are oriented in the same or close to the same direction as the SC-TRP A. It is noted that more than one transmit beam may be selected if the UE does not have a transmit beam oriented directly at the SC-TRP A. Additionally, because the location of the SC-TRP A is an approximation, more than one transmit beams may be selected to help ensure that the SC-TRP A is within the coverage area of at least one of the more than one transmit beams.

The UE participates in UL beacon transmission along selected beaconing channel resources and beam alignment (block 1436). As discussed previously, as part of beacon scanning, the UE may beamform a beacon and transmit the beamformed beacon over a beaconing channel using the one or more selected transmit beams. With beam alignment, the UE cycles through receive beams to determine a best receive beam to receive a transmission from the SC-TRP A. The information provided by the network entity is used to help reduce the number of receive beams the UE cycles through during beam alignment. The UE receives further assistance in the form of information from the network device (block 1438). The information includes information about the addition of the SC-TRP A to the set of TRPs serving the UE, as well as information about the best beams provided by the SC-TRP A. The UE participates in beam refinement and beam tracking with the SC-TRP A (block 1440). Participating in beam refinement and beam tracking involves the UE using a transmit beam, as indicated as a best beam according to information provided by the network, to transmit signals, such as reference signals, to the SC-TRP A to allow the SC-TRP A to refine and track (e.g., adjust beamwidth, adjust beam orientation, and so on) the UE.

Figure 14C:
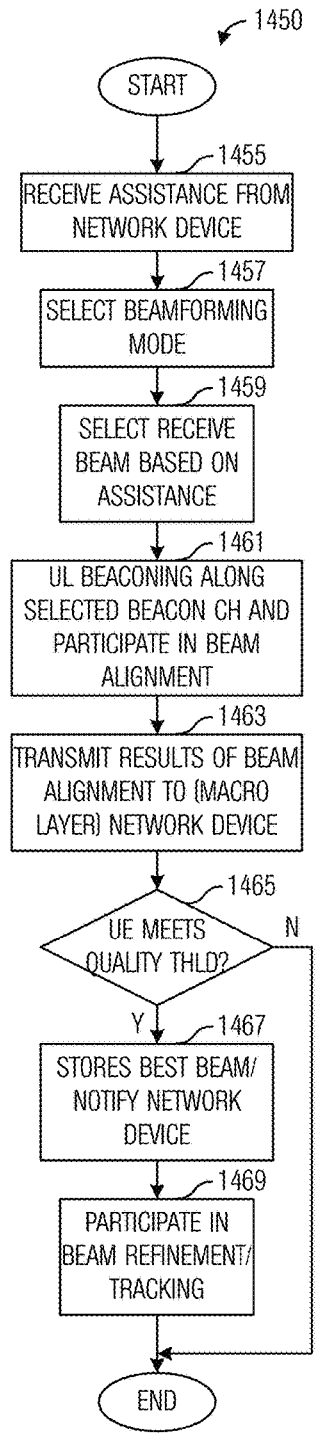
FIG. 14C illustrates a flow diagram of example operations occurring in a small cell TRP (SC-TRP) participating in network assisted uplink beacon, network scanning, beam alignment to refinement and tracking, and serving TRP selections according to example embodiments described herein.

FIG. 14C illustrates a flow diagram of example operations 1450 occurring in a SC-TRP participating in network assisted beacon scanning and beam alignment. Operations 1450 may be indicative of operations occurring in a SC-TRP participating in network assisted uplink beacon, network scanning, beam alignment to refinement and tracking, and serving TRP selections.

Operations 1450 begin with the SC-TRP A receiving assistance in the form of information from a network device (block 1455). Examples of the information provided by the network entity include network resource (e.g., beaconing channel) information, beam information of the UE, an approximate location of the UE, and so forth. The SC-TRP A selects a beamforming mode (block 1457). The beamforming mode may be MLS or MDB, for example. The SC-TRP A selects one or more receive beams in accordance with the assistance provided by the network entity (block 1459). As an illustrative example, out of a plurality of receive beams, the SC-TRP A is able to select one or more receive beams that are oriented in the same or close to the same direction as the UE. It is noted that more than one receive beam may be selected if the SC-TRP A does not have a receive beam oriented directly at the UE. Additionally, because the location of the UE is an approximation, more than one receive beams may be selected to help ensure that the UE is within the coverage area of at least one of the more than one receive beams.

The SC-TRP A participates in UL beacon scanning along selected channel and beam alignment (block 1461). As discussed previously, as part of beacon scanning, the SC-TRP A scans a beaconing channel containing beamformed beacon signals transmitted by the UE using receive beams selected in accordance with the information provided by the network entity. The SC-TRP A determines which receive beam resulted in a measurement of the beamformed beacon signal transmitted by the UE with the highest signal strength, for example. With beam alignment, the SC-TRP A transmits signals, such as reference signals, using transmit beams selected in accordance with the information provided by the network entity. The transmit beams may be selected using the approximation of the location of the UE, as was the selection of the receive beams. The SC-TRP A transmits results of the beacon scanning and beam alignment to the network entity (block 1463). As an illustrative example, the SC-TRP A transmits information about the signal strength of the strongest received beacon transmitted by the UE. As another illustrative example, the SC-TRP A transmits information about the best beams, such as the best transmit beam of the UE and the best receive beam of the SC-TRP A. In some configurations, such as with a TDD communications system, the best transmit beam of the UE and the best receive beam of the SC-TRP A also corresponds to the best receive beam of the UE and the best transmit beam of the SC-TRP A.

The SC-TRP A performs a check to determine if the signal quality of the UE meets a quality threshold (block 1465). The quality threshold may be a value specified in a technical standard or by an operator of the communications system. Alternatively, the devices in the communications system may determine the quality threshold based on the conditions of the communications system, such as error rate, channel quality, channel measurements, network traffic, and so on. If the signal quality of the UE meets the quality threshold, the SC-TRP A stores information about the best beams determined during beacon scanning and beam alignment (block 1467). The SC-TRP A participates in beam refinement and beam tracking with the UE (block 1469). Participating in beam refinement and beam tracking involves the SC-TRP A adjusting the receive beam to maximize signal strength of received signals transmitted by the UE. The beam refinement and beam tracking allows the SC-TRP A to refine and track (e.g., adjust beamwidth, adjust beam orientation, and so on) the UE. If the signal quality of the UE does not meet the quality threshold, operations 1450 ends.

Figures 15A, 15B:
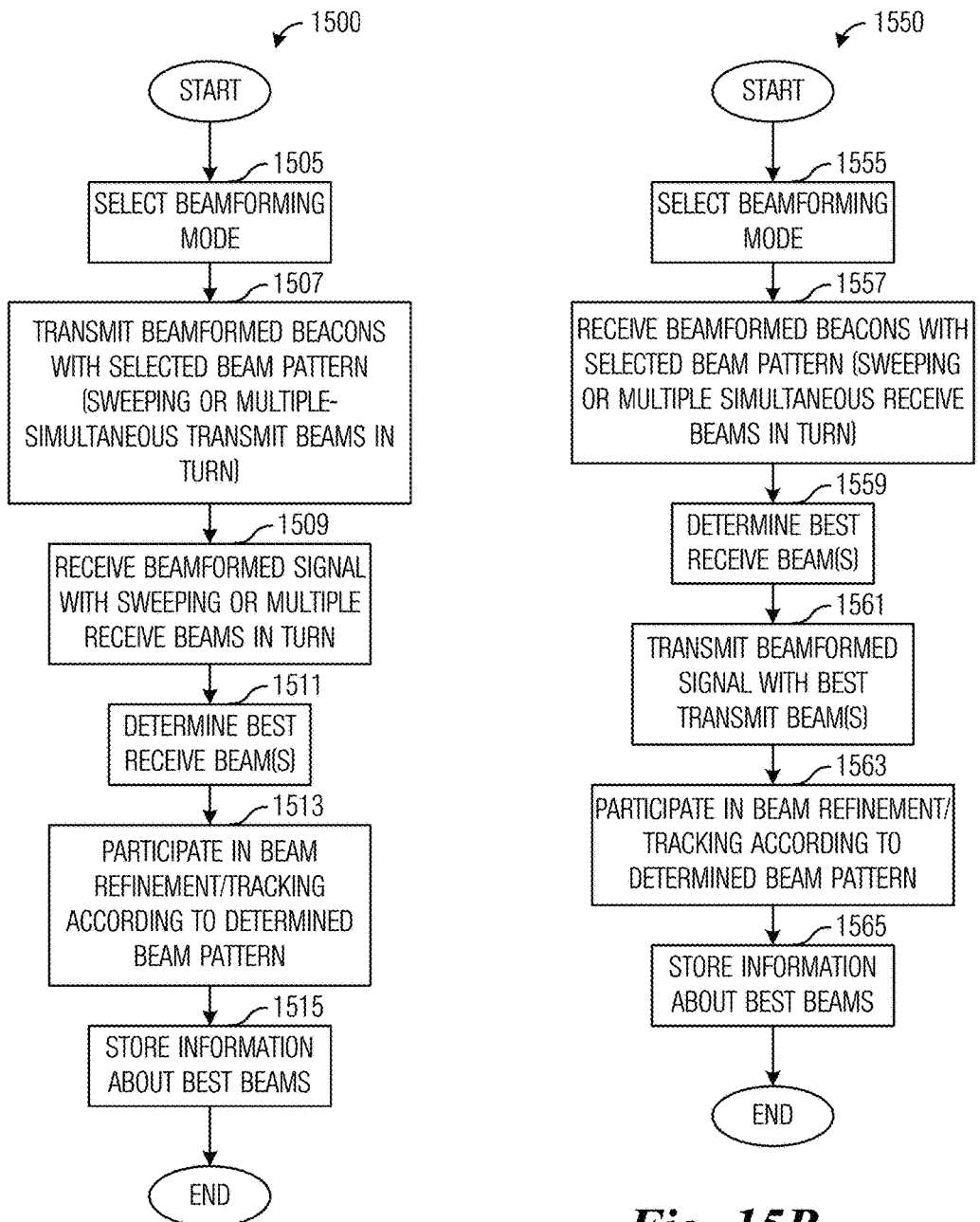
FIG. 15A illustrates a flow diagram of example operations occurring in a UE participating in uplink beacon, (TRP-based) network-side beacon scanning, beam adjustment (from alignment to refinement to tracking), and serving TRP selections, all without network assistance according to example embodiments described herein.
FIG. 15B illustrates a flow diagram of example operations occurring in a SC-TRP participating in beacon scanning and beam adjustment (from alignment to refinement to tracking), and serving TRP selections, all without network assistance according to example embodiments described herein.

FIG. 15A illustrates a flow diagram of example operations 1500 occurring in a UE participating in beacon scanning and beam adjustment without network assistance. Operations

1500 may be indicative of operations occurring in a UE participating in uplink beacon, (TRP-based) network-side beacon scanning, beam adjustment (from alignment to refinement to tracking), and serving TRP selections, all without network assistance.

Operations 1500 begin with the UE selecting a beamforming mode (block 1505). The beamforming mode may be MLS or MDB, for example. The UE transmits beamformed beacons with a selected beam pattern (sweeping or multiple simultaneous transmit beams in turn) (block 1507). The beam pattern may have been selected during the selection of the beamforming mode. The UE transmits a beamformed beacon signal using a transmit beam per beacon interval. Alternatively, the UE transmits a beamformed beacon signal using more than one transmit beams per beacon interval. The UE receives a beamformed signal from the SC-TRP A using swept or multiple simultaneous transmit beams in turn (block 1509). The UE receives a beamformed signal, such as a reference signal, from the SC-TRP A using one receive beam per sweeping interval, while the SC-TRP A cycles through available transmit beams, one transmit beam at a time. Alternatively, the SC-TRP A transmits the beamformed signal using more than one transmit beam per sweeping interval. The UE determines a best receive beam(s) (block 1511). The UE determines the best receive beam in accordance with measured signal strengths of the beamformed signals transmitted by the SC-TRP A, for example. Blocks 1507, 1509, and 1511 may be collectively referred to as participating in beacon scanning and beam alignment.

The UE participates in beam refinement and beam tracking according to determined beam pattern (block 1513). Beam refinement and beam tracking may involve the transmitting of a beamformed signal, such as a reference signal, using the best transmit beam of the UE, which is determinable from the best receive beam of the UE determined in block 1511. While the UE is transmitting the beamformed reference signal on the best transmit beam, the SC-TRP A is refining and tracking the UE. The UE stores information regarding the best transmit beam and the best receive beam (block 1515). The UE may also store information regarding a best transmit beam of the SC-TRP A.

FIG. 15B illustrates a flow diagram of example operations 1550 occurring in a SC-TRP participating in beacon scanning and beam adjustment without network assistance. Operations 1550 may be indicative of operations occurring in a SC-TRP participating in beacon scanning and beam adjustment (from alignment to refinement to tracking), and serving TRP selections, all without network assistance.

Operations 1550 begin with the SC-TRP A selecting a beamforming mode (block 1555). The beamforming mode may be MLS or MDB, for example. The SC-TRP A receives beamformed beacons transmitted by the UE with the UE using a selected beam pattern (sweeping or multiple simultaneous receive beams) in turn (block 1557). The SC-TRP A uses all receive beams, one at a time, to receive the beamformed beacons transmitted by the UE. Alternatively, the SC-TRP A uses more than one receive beam to receive the beamformed beacons transmitted by the UE. The SC-TRP A determines a best receive beam(s) (block 1559). The SC-TRP A determines the best receive beam in accordance with measured signal strengths of the beamformed beacons transmitted by the UE, for example. The SC-TRP A transmits a beamformed signal, such as a reference signal, with the best transmit beam(s) (block 1561). The best transmit beam may be determined from the best receive beam determined in block 1559. Blocks 1557, 1559, and 1561 may be collectively referred to as participating in beacon scanning and beam alignment.

The SC-TRP A participates in beam refinement and beam tracking according to determined beam pattern (block 1563). The SC-TRP A refines and tracks beamformed transmissions from the UE. The SC-TRP A may adjust the beamwidth of the receive beam, change the orientation of the receive beam, or both based on the received transmissions from the UE. The SC-TRP A stores information about the best transmit beam and the best receive beam (block 1565). The SC-TRP A may also store information regarding the best transmit beam of the UE.

Figure 16:
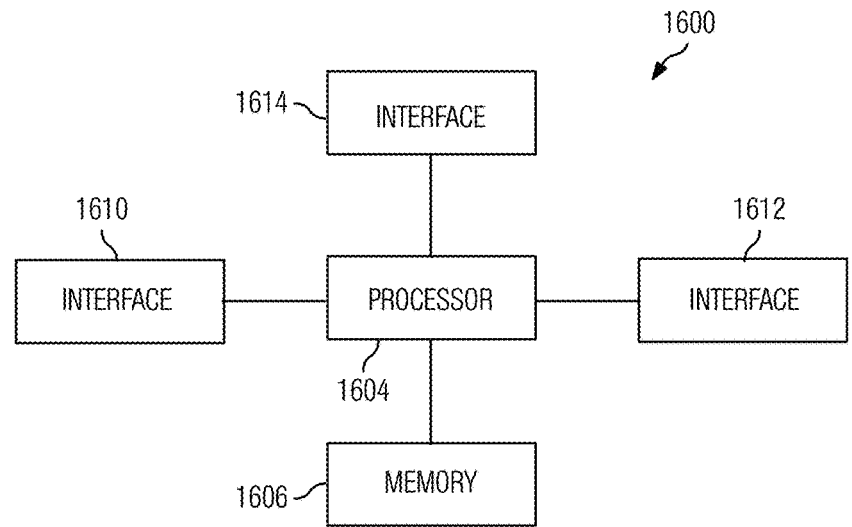
FIG. 16 illustrates a block diagram of an embodiment processing system for performing methods described herein.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As an example, one or more of the interfaces 1610, 1612, 1614 may be adapted to perform beamforming (including beam alignment, beam refinement, and so on), signaling (such as network assistance), and beaconing. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
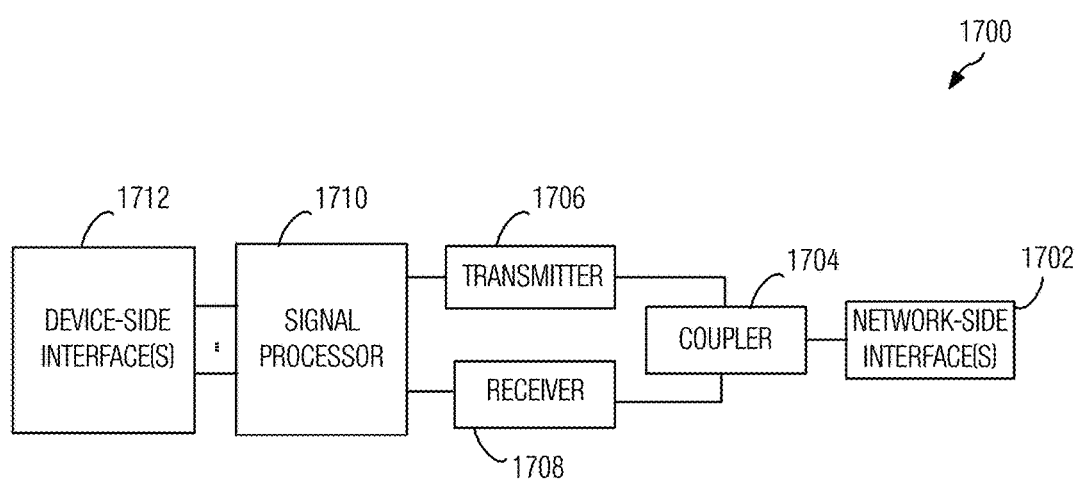
FIG. 17 illustrates a block diagram of a transceiver adapted to transmit and receive signaling over a telecommunications network according to example embodiments described herein.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface

1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. As an example, network interface 1702 may be adapted to perform beamforming (including beam alignment, beam refinement, and so on), signaling (such as network assistance), and beaconing. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a beamforming unit/module, a selecting unit/module, a determining unit/module, a repeating unit/module, and/or an adjusting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method implemented by a user equipment (UE), the method comprising:
   receiving, by the UE, a message from a first network device, the message specifying uplink beaconing channel information that includes uplink beaconing direction information and uplink beaconing timing information associated with a second network device;
   selecting a set of transmit beams in accordance with the uplink beaconing direction information and the uplink beaconing timing information specified by the message received from the first network device; and based thereon transmitting, by the UE, beamformed beacon signals to the second network device using transmit beams in the selected set of transmit beams; and
   receiving, by the UE, beamformed downlink reference signals from the second network device.

2. The method of claim 1, wherein the uplink beaconing channel information from the first network device further comprises at least one of an approximate location of the second network device, uplink beacon channel resources in code and frequency, or uplink beamform information of the second network device.

3. The method of claim 1, further comprising:
   selecting, by the UE, a best transmit beam in accordance with a best receive beam associated with the second network device; and based thereon transmitting, by the UE, a beamformed reference signal to the second network device over an uplink channel using the selected best transmit beam.

4. The method of claim 1, wherein the beamformed beacon signals are transmitted over a dedicated uplink beaconing channel, or over a transmission opportunity that is randomly or pseudo-randomly selected by the UE in accordance with the uplink beaconing channel information, that is explicitly received by the UE in the uplink beaconing channel information.

5. The method of claim 1, wherein the first network device is a transmit receive point (TRP), a base station, a UE, or a core network device.

6. The method of claim 1, wherein the beamformed beacon signals are transmitted over a dedicated beaconing channel, a shared channel for scheduled uplink access, or a shared channel for uplink random access.

7. The method of claim 1, wherein the beamformed beacon signals comprise sounding signal at a physical layer, a message at a media access control layer or a radio resource control layer, a scheduled uplink reference signal, or an uplink random access preamble.

8. The method of claim 1, wherein the uplink beaconing channel information further includes at least one of uplink beaconing duration information, uplink beaconing sequence information or uplink beaconing frequency information.

9. The method of claim 1, wherein the uplink beaconing channel information is received over an independent beamformed carrier or channel.

10. The method of claim 1, wherein the uplink beaconing channel information is received over an omni-beamformed channel.

11. The method of claim 1, wherein the uplink beaconing channel information is received over a lower-frequency carrier or cell than that over which the beamformed beacon signals are transmitted.

12. The method of claim 1, wherein the uplink beaconing channel information is received via a radio resource control (RRC) signal.

13. The method of claim 1, wherein the uplink beaconing channel information is received over a non-access stratum (NAS) signal.

14. The method of claim 1, wherein the uplink beaconing channel information is received via a physical control signal.

15. The method of claim 1, wherein the first network device differs from the second network device in physical locations, carrier frequencies, or coverage areas.

16. The method of claim 1, wherein the UE communicates with the first network device over a lower carrier frequency than the second network device.

17. The method of claim 1, wherein the UE communicates with the first network device over a wider frequency spectrum, or using a wider beamwidth, than the second network device.

18. The method of claim 1, further comprising:
 selecting, by the UE, a best receive beam from a set of receive beams based on the uplink beaconing information for the selected set of transmit beams to the second network device.

19. A user equipment (UE) comprising:
 a processor; and
 a non-transitory computer readable storage medium storing programming for execution by the processor, the programming including instructions to:
  receive a message from a first network device, the message specifying uplink beaconing channel information that includes uplink beaconing direction information and uplink beaconing timing information associated with a second network device;
  select a set of transmit beams in accordance with the uplink beaconing direction information and the uplink beaconing timing information specified by the message received from the first network device; and based thereon transmitting, by the UE, beamformed beacon signals to the second network device using transmit beams in the selected set of transmit beams; and
  receive beamformed downlink reference signals from the second network device.

20. The UE of claim 19, wherein the uplink beaconing channel information from the first network device further comprises at least one of an approximate location of the second network device, uplink beacon channel resources in code and frequency, or uplink beamform information of the second network device.

21. The UE of claim 19, wherein the programming further includes instructions to:
 select a best transmit beam in accordance with a best receive beam associated with the second network device; and based thereon transmit a beamformed reference signal to the second network device over an uplink channel using the selected best transmit beam.

22. The UE of claim 19, wherein the beamformed beacon signals are transmitted over a dedicated uplink beaconing channel, or over a transmission opportunity that is randomly or pseudo-randomly selected by the UE in accordance with the uplink beaconing channel information, that is explicitly received by the UE in the uplink beaconing channel information.

23. The UE of claim 19, wherein the first network device is a transmit receive point (TRP), a base station, a UE, or a core network device.

24. The UE of claim 19, wherein the beamformed beacon signals are transmitted over a dedicated beaconing channel, a shared channel for scheduled uplink access, or a shared channel for uplink random access.

25. The UE of claim 19, wherein the beamformed beacon signals comprises a sounding signal at a physical layer, a message at a media access control layer or a radio resource control layer, a scheduled uplink reference signal, or an uplink random access preamble.

26. The UE of claim 19, wherein the uplink beaconing channel information further includes at least one of uplink beaconing duration information, uplink beaconing sequence information or uplink beaconing frequency information.

27. The UE of claim 19, wherein the uplink beaconing channel information is received over an independent beamformed carrier or channel.

28. The UE of claim 19, wherein the uplink beaconing channel information is received over an omni-beamformed channel.

29. The UE of claim 19, wherein the uplink beaconing channel information is received over a lower-frequency carrier or cell than that over which the beamformed beacon signals are transmitted.

30. The UE of claim 19, wherein the uplink beaconing channel information is received via a radio resource control (RRC) signal.

31. The UE of claim 19, wherein the uplink beaconing channel information is received over a non-access stratum (NAS) signal.

32. The UE of claim 19, wherein the uplink beaconing channel information is received via a physical control signal.

33. The UE of claim 19, wherein the first network device differs from the second network device in physical locations, carrier frequencies, or coverage areas.

34. The UE of claim 19, wherein the UE communicates with the first network device over a lower carrier frequency than the second network device.

35. The UE of claim 19, wherein the UE communicates with the first network device over a wider frequency spectrum, or using a wider beamwidth, than the second network device.

36. The UE of claim 19, wherein the programming further includes instructions to:
 select a best receive beam from a set of receive beams based on the uplink beaconing information for the selected set of transmit beams to the second network device.

37. A method implemented by a first network device, the method comprising:
 transmitting, by the first network device, a message to a user equipment (UE), the message specifying uplink beaconing channel information that includes uplink beaconing direction information and uplink beaconing timing information associated with a second network device, the message instructing, or otherwise prompting, the UE to select a set of transmit beams, in accordance with the uplink beaconing direction information and the uplink beaconing timing information, for transmitting uplink beamformed beacon signals to the second network device.

38. A first network device comprising:
 a processor; and
 a non-transitory computer readable storage medium storing programming for execution by the processor, the programming including instructions to:
  transmit a message to a user equipment (UE), the message specifying uplink beaconing channel information that includes uplink beaconing direction information and uplink beaconing timing information associated with a second network device, the message instructing, or otherwise prompting, the UE to select a set of transmit beams, in accordance with the uplink beaconing direction information and the uplink beaconing timing information, for transmitting uplink beamformed beacon signals to the second network device.

\* \* \* \* \*